(12) United States Patent
Maruo et al.

(10) Patent No.: US 9,546,699 B2
(45) Date of Patent: Jan. 17, 2017

(54) CLUTCHED MOTOR AND DEVICE FOR OPENING AND CLOSING OPENABLE BODY

(71) Applicant: ASMO Co., Ltd., Shizuoka-ken (JP)

(72) Inventors: Kazuki Maruo, Fukuroi (JP); Yoshiki Matsushita, Iwata (JP); Kousuke Yamaura, Hamamatsu (JP)

(73) Assignee: ASMO CO., LTD., Shizuoka-ken (JP)

( * ) Notice: Subject to any disclaimer, the term of this patent is extended or adjusted under 35 U.S.C. 154(b) by 52 days.

(21) Appl. No.: 14/714,563

(22) Filed: May 18, 2015

(65) Prior Publication Data

US 2015/0337911 A1    Nov. 26, 2015

(30) Foreign Application Priority Data

May 20, 2014  (JP) ................. 2014-104405
Dec. 15, 2014  (JP) ................. 2014-253447
Apr. 20, 2015  (JP) ................. 2015-086191

(51) Int. Cl.

| | |
|---|---|
| F16D 47/00 | (2006.01) |
| F16D 43/16 | (2006.01) |
| F16D 47/02 | (2006.01) |
| B60J 7/00 | (2006.01) |
| E05B 1/00 | (2006.01) |
| F16D 48/06 | (2006.01) |
| B60J 7/057 | (2006.01) |

(Continued)

(52) U.S. Cl.
CPC ................. *F16D 47/00* (2013.01); *B60J 7/00* (2013.01); *B60J 7/0573* (2013.01); *E05B 1/00* (2013.01); *F16D 43/16* (2013.01); *F16D 47/02* (2013.01); *F16D 48/06* (2013.01); *F16D 3/06* (2013.01); *F16D 3/10* (2013.01)

(58) Field of Classification Search
None
See application file for complete search history.

(56) References Cited

U.S. PATENT DOCUMENTS 5,250,882 A    10/1993  Odoi et al.
2008/0121489 A1*  5/2008  Chevalier ................. F16D 3/68
                                          192/105 BB (Continued)

FOREIGN PATENT DOCUMENTS

| JP | H 054521 A | 1/1993 |
|---|---|---|
| JP | 2003211971 A | 7/2003 |
| JP | 2010221959 A | 10/2010 |

*Primary Examiner* — Mark Manley
(74) *Attorney, Agent, or Firm* — Patterson Thuente Pedersen, P.A.

(57) ABSTRACT

First and second clutches allow first and second tubular output shafts to pivot when a motor generates rotation at a second rotation speed or higher. A third clutch allows a pivot shaft to pivot when the motor rotates at a speed lower than a first rotation speed. A control plate is arranged at a first pivot position, second pivot position, or third pivot position. At the first pivot position, the first and second tubular output shafts are moved to positions in an axial direction allowing first and second rotated members to rotate. At the second pivot position, the first and second tubular output shafts are moved to positions in the axial direction allowing only the first rotated member to rotate. At the third pivot position, the first and second tubular output shafts are moved to positions in the axial direction allowing only the second rotated member to rotate.

7 Claims, 13 Drawing Sheets

(51) Int. Cl.
 *F16D 3/06* (2006.01)
 *F16D 3/10* (2006.01)

(56) References Cited

U.S. PATENT DOCUMENTS

2013/0074650 A1   3/2013   Kim et al.
2015/0038291 A1   2/2015   Kenichi

* cited by examiner

CLUTCHED MOTOR AND DEVICE FOR OPENING AND CLOSING OPENABLE BODY

BACKGROUND OF THE INVENTION

The present invention relates to a clutched motor and a device for opening and closing an openable body.

In the prior art, devices for opening and closing an openable body include a sunroof device provided in a roof (roof panel) of an automobile. Generally, the vehicle sunroof device includes a roof glass and a sunshade. The roof glass and the sunshade can both be opened and closed. The sunshade can be opened when the roof glass is closed to allow ambient light to enter the vehicle interior. The roof glass and the sunshade can both be opened to allow fresh air, in addition to ambient light, to enter the vehicle interior. When the roof glass and the sunshade are both closed, the interior of the vehicle is shielded from the ambient light and the fresh air. For such type of a sunroof device, studies have been conducted to develop a device that open and close the roof glass and the sunshade by electric motors (for example, Japanese Laid-Open Patent Publication No. 5-4521).

The sunroof device disclosed in Japanese Laid-Open Patent Publication No. 5-4521 uses different electric motors for the glass panel and the sunshade when opening and closing the glass panel and the sunshade. More specifically, the sunroof device includes two electric motors. This increases the cost, size, and weight of the sunroof device.

SUMMARY OF THE INVENTION

It is an object of the present invention to provide a clutched motor and a device for opening and closing an openable body that decreases the cost, weight, and size.

To achieve the above object, a clutched motor according to one aspect of the present invention includes a first tubular output shaft, a first rotating body, a second tubular output shaft, a second rotating body, a control plate, and a third rotating body. The first tubular output shaft moves in an axial direction to rotate a first rotated member. The first rotating body is rotated by a motor. The first rotating body is coupled to the first tubular output shaft by a first clutch to be rotatable integrally with the first tubular output shaft. The second tubular output shaft moves in the axial direction to rotate a second rotated member. The second rotating body is rotated by the motor. The second rotating body is coupled to the second tubular output shaft by a second clutch to be rotatable integrally with the second tubular output shaft. The control plate pivots together with a pivot shaft to control movement of the first and second tubular output shafts in the axial direction. The third rotating body is rotated by the motor. The third rotating body is coupled to the pivot shaft by a third clutch to be rotatable integrally with the pivot shaft. Each of the first, second, and third clutches is a centrifugal clutch. The first and second clutches are configured to allow the first and second tubular output shafts to pivot when the motor generates rotation at a second rotation speed or higher and to stop pivoting of the first and second tubular output shafts when the motor generates rotation at a speed lower than the second rotation speed. The third clutch is configured to allow the pivot shaft to pivot when the motor generates rotation at a speed lower than a first rotation speed, which is lower than the second rotation speed, and to stop pivoting of the pivot shaft when the motor generates rotation at the first rotation speed or higher. The control plate is controlled to be arranged at a first pivot position, a second pivot position, or a third pivot position. At the first pivot position, the first and second tubular output shafts are moved to positions in the axial direction allowing the first and second rotated members to rotate. At the second pivot position, the first and second tubular output shafts are moved to positions in the axial direction allowing only the first rotated member to rotate. At the third pivot position, the first and second tubular output shafts are moved to positions in the axial direction allowing only the second rotated member to rotate.

To achieve the above object, a device for opening and closing an openable body according to a further aspect of the present invention opens and closes a first openable body and a second openable body. The device includes a first tubular output shaft, a first rotating body, a second tubular output shaft, a second rotating body, a control plate, and a third rotating body. The first tubular output shaft rotates a first rotated member and moves in an axial direction to open and close the first openable body. The first rotating body is rotated by a motor. The first rotating body is coupled to the first tubular output shaft by a first clutch and rotated integrally with the first tubular shaft. The second tubular output shaft rotates a second rotated member and moves in the axial direction to open and close the second openable body. The second rotating body is rotated by the motor. The second rotating body is coupled to the second tubular output shaft by a second clutch and rotated integrally with the second tubular shaft. The control plate pivots together with a pivot shaft to control movement of the first and second tubular output shafts in the axial direction. The third rotating body is rotated by the motor. The third rotating body is coupled to the pivot shaft by a third clutch and rotated integrally with the pivot shaft. Each of the first, second, and third clutches is a centrifugal clutch. The first and second clutches are configured to allow the first and second tubular output shafts to pivot when the motor generates rotation at a second rotation speed or higher and to stop pivoting of the first and second tubular output shafts when the motor rotates at a speed lower than the second rotation speed. The third clutch is configured to allow the pivot shaft to pivot when the motor generates rotation at a speed lower than a first rotation speed, which is lower than the second rotation speed, and to stop pivoting of the pivot shaft when the motor generates rotation at the first rotation speed or higher. The control plate is controlled to be arranged at a first pivot position, a second pivot position, or a third pivot position. At the first pivot position, the first and second tubular output shafts are moved to positions in the axial direction allowing the first and second rotated members to rotate in order to open and close the first and second openable bodies. At the second pivot position, the first and second tubular output shafts are moved to positions in the axial direction allowing only the first rotated member to rotate in order to open and close the first openable body. At the second pivot position, the first and second tubular output shafts are moved to positions in the axial direction allowing only the second rotated member to rotate in order to open and close the second openable body.

BRIEF DESCRIPTION OF DRAWINGS

The invention, together with objects and advantages thereof, may best be understood by reference to the following description of the presently preferred embodiments together with the accompanying drawings in which.

DETAILED DESCRIPTION OF PREFERRED EMBODIMENTS

One embodiment of a device for opening and closing an openable body applied to a vehicle sunroof device will now be described.

Figure 1:
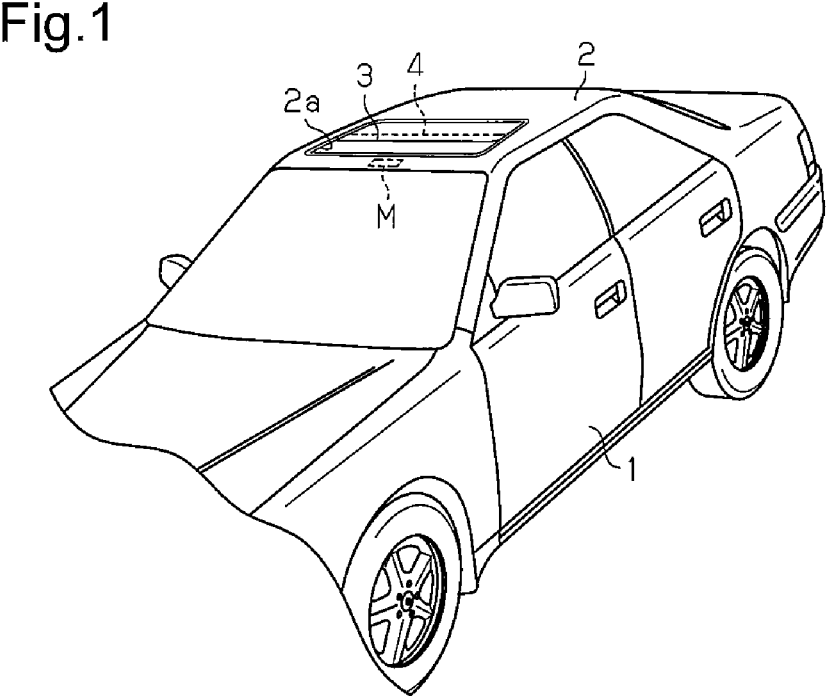
FIG. 1 is a perspective view showing a main portion of a vehicle including a vehicle sunroof device according to one embodiment of the present invention.

FIG. 1 is a perspective view showing a main portion of a vehicle including the vehicle sunroof device. A tetragonal roof opening 2a is formed in a roof panel 2 of a vehicle 1. A transparent roof glass 3 (second openable body) is arranged in the roof opening 2a. The roof glass 3 is movable and slides back and forth in the front and rear directions (opening/closing slide operation).

A sunshade 4 (first openable body), which is formed by a light-blocking synthetic resin plate, is arranged at a lower side (vehicle interior side) of the roof opening 2a, that is, on a lower side of the roof glass 3. The sunshade 4 is movable and slides back and forth in the front and rear directions in the same manner as the roof glass 3.

When the roof glass 3 and the sunshade 4 are moved toward the rear, the roof opening 2a opens, that is, the roof opening 2a is not closed by both of the roof glass 3 and the sunshade 4. In this condition, fresh air and ambient light can enter the vehicle interior. When the roof glass 3 is moved toward the front and the sunshade 4 is moved toward the rear, the roof opening 2a is closed by the roof glass 3 but not by the sunshade 4. In this condition, fresh air cannot enter the vehicle interior but ambient light can enter the vehicle interior. When the roof glass 3 and the sunshade 4 are moved toward the front, the roof opening 2a is closed by both of the roof glass 3 and the sunshade 4. In this state, fresh air and ambient light cannot enter the vehicle interior.

As shown in FIG. 1, a motor M is arranged between the roof panel 2 and an inner roof panel (not shown), which is located at the side of the passenger compartment, at a front end portion of the roof opening 2a. The motor M is a driving source that slides and moves the roof glass 3 back and forth in the front and rear directions (opening and closing operation) and also slides and moves the sunshade 4 in the front and rear directions.

Thus, the roof glass 3 and the sunshade 4 are moved, independently from each other, in the front and rear directions by the same motor M.

A drive mechanism for the roof glass 3 and the sunshade 4 will now be described.

Figure 2:
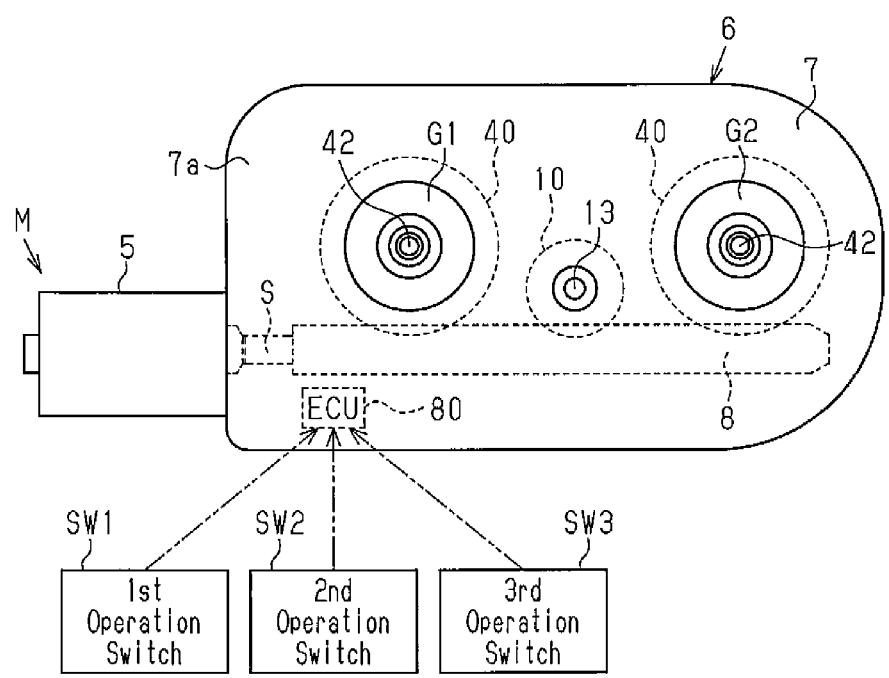
FIG. 2 is a front view showing a clutched motor of the vehicle sunroof device illustrated in FIG. 1.

As shown in FIG. 2, the motor M includes an output shaft S projecting from a motor case 5. The output shaft S projects into a case housing 7 of a reduction-clutch unit 6 provided side by side with the motor case 5. The output shaft S is coupled to a worm shaft 8, which is rotatably supported in the case housing 7, to drive the worm shaft 8.

A first pinion G1 (first rotated member) and a second pinion G2 (second rotated member) are rotationally arranged on a front wall 7a of the case housing 7. The first pinion G1 moves the sunshade 4 through a driving force transmission mechanism (not shown). The second pinion G2 moves the roof glass 3 through a driving force transmission mechanism (not shown).

Rotation of the output shaft S (worm shaft 8) in forward and reverse directions rotates the first pinion G1 and the second pinion G2 in forward and reverse directions through a first pinion drive mechanism A (refer to FIG. 4) and a second pinion drive mechanism B (refer to FIG. 4), respectively. The first pinion drive mechanism A and the second pinion drive mechanism B are arranged in the case housing 7.

Figure 3:
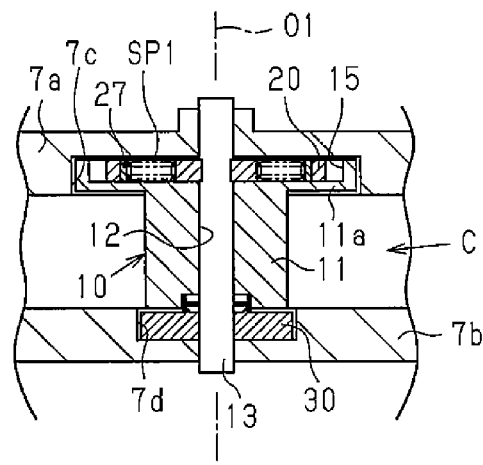
FIG. 3 is a cross-sectional view showing a switching control mechanism for the clutched motor of FIG. 2.

The case housing 7 further includes a switching control mechanism C (refer to FIG. 3). The switching control mechanism C controls the first and second pinion drive mechanisms A and B so that at least one of the first and second pinions G1 and G2 rotates in the forward and reverse directions.

Switching Control Mechanism C

The switching control mechanism C will first be described.

Switching Wheel Main Body 11

As shown in FIG. 3, the switching control mechanism C includes a switching worm wheel 10 (third rotating body) engaged with the worm shaft 8 shown in FIG. 2 and rotated in the forward and reverse directions. As shown in FIG. 3, the switching worm wheel 10 includes a switching wheel main body 11. A shaft hole 12 is formed at a center portion of the switching wheel main body 11. A switching output shaft 13 (pivot shaft) is inserted through the shaft hole 12. The switching worm wheel 10 is rotatably supported by the switching output shaft 13. A lower end portion of the switching output shaft 13 is coupled to a rear wall 7b of the case housing 7 and is rotatable but immovable in the axial direction. An upper end portion of the switching output shaft 13 is coupled to the front wall 7a of the case housing 7 and is rotatable but immovable in the axial direction.

The switching wheel main body 11 includes an upper outer circumferential portion where a flange 11a is formed. Gear teeth, which are engaged with the worm shaft 8, are formed on the outer circumferential surface of the switching wheel main body 11 excluding the flange 11a. Thus, the rotation of the worm shaft 8 in the forward and reverse directions rotates (pivots) the switching wheel main body 11 about a center axis O1 of the switching output shaft 13 in the case housing 7 in the forward and reverse directions.

In the present embodiment, a speed reduction ratio R1, which is the ratio of the rotation speed of the switching wheel main body 11 relative to the rotation speed of the worm shaft 8 (output shaft S), is set in advance.

As shown in FIG. 3, the flange 11a of the switching wheel main body 11 is fitted into a fitting recess 7c formed in an inner surface of the front wall 7a of the case housing 7.

Figure 5A:
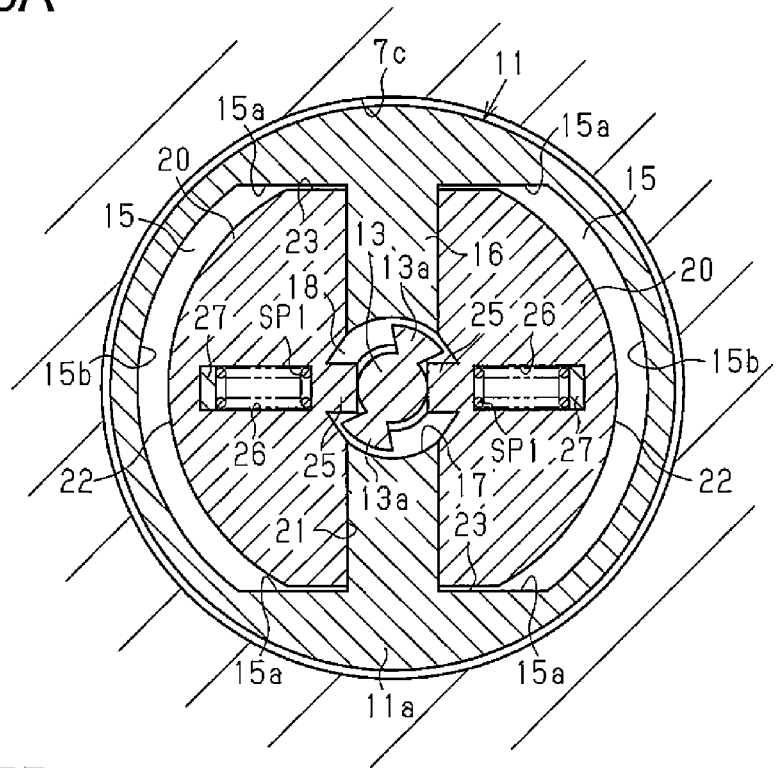
FIG. 5A is a diagram showing an engaged position where an engagement pin of a switching operation plate of FIG. 3 is engaged with a first engagement piece of a switching output shaft.
Figure 5B:
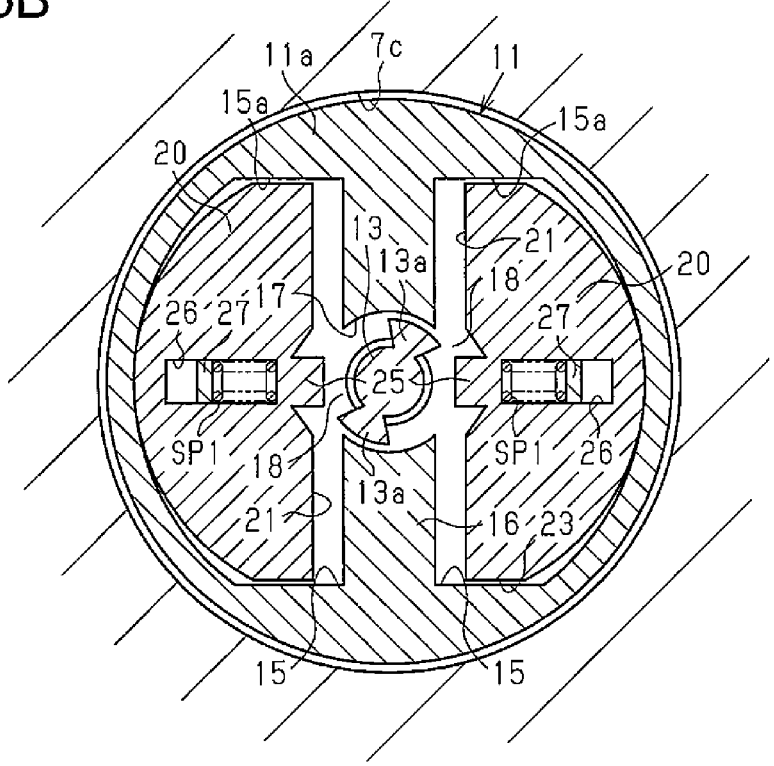
FIG. 5B is a diagram showing a disengaged position where the engagement pin of the switching operation plate of FIG. 3 is disengaged from the first engagement piece of the switching output shaft.

As shown in FIGS. 5A and 5B, an upper surface of the switching wheel main body 11 in the axial direction includes two accommodation recesses 15 that are symmetrical in the sideward direction. The accommodation recesses 15 have flat inner bottom surfaces. The accommodation recesses 15, which are symmetrical in the sideward direction and formed in the axial upper surface of the switching wheel main body 11, define a stopper wall 16 between the accommodation recesses 15.

As shown in FIGS. 5A and 5B, each of the accommodation recesses 15 includes inner surfaces (guide surfaces 15a) that extend in a direction orthogonal to an extending direction of the stopper wall 16 and face each other. The guide surfaces 15a are flat parallel surfaces. The accommodation recess 15 further includes an inner surface (arcuate surface 15b) opposing the stopper wall 16. The center of a hypothetical circle lying along the arcuate surface 15b coincides with the center axis O1.

As shown in FIGS. 5A and 5B, a large diameter hole 17, having a larger diameter than the shaft hole 12, is formed in the axial upper surface of the switching wheel main body 11. The large diameter hole 17 is open space rotationally (pivotally) accommodating two first engagement pieces 13a. The two first engagement pieces 13a are arranged on the outer circumferential surface of the switching output shaft 13 at opposite sides of the center axis O1. Each first engagement piece 13a projects toward the outer side in the radial direction.

The formation of the large diameter hole 17 separates the stopper wall 16 at opposite sides of the large diameter hole 17. A portion of the contour of the inner bottom surface of each accommodation recess 15 hypothetically extends into the accommodation recess 15 to define a hypothetical boundary between the circular large diameter hole 17 and the accommodation recess 15. In other words, the large diameter hole 17 partially extends into the accommodation recesses 15. The two accommodation recesses 15 each include a pin inlet 18, which is in communication with the large diameter hole 17. Each pin inlet 18 is arranged in the corresponding accommodation recess 15 between the stopper walls 16.

Switching Operation Plate 20

As shown in FIGS. 5A and 5B, the two accommodation recesses 15 each accommodate a switching operation plate 20 (third centrifugal clutch, switching operation member). The switching operation plate 20 includes a first stopper surface 21 that is located at an inner side in the radial direction and contacts the stopper wall 16. The switching operation plate 20 further includes an arcuate second stopper surface 22 that is located at an outer side in the radial direction and comes into contact with the arcuate surface 15b of the accommodation recess 15.

When the first stopper surface 21 is in contact with the stopper wall 16, the second stopper surface 22 is separated from the arcuate surface 15b. When, on the other hand, the second stopper surface 22 is in contact with the arcuate surface 15b, the first stopper surface 21 is separated from the stopper wall 16.

The switching operation plate 20 further includes sliding surfaces 23 that are located at the two sides and come into contact with the guide surfaces 15a of the accommodation recess 15. Thus, the switching operation plate 20 is movable in the radial direction along the two guide surfaces 15a and rotated integrally with the switching wheel main body 11.

The first stopper surface 21 of the switching operation plate 20 includes an engagement pin 25 that is located at the center of the first stopper surface 21 and projects toward the inner side in the radial direction. A distal end portion of the engagement pin 25 is formed so that when the second stopper surface 22 is in contact with the arcuate surface 15b, the engagement pin 25 does not overlap the portion of the contour of the inner bottom surface of the accommodation recess 15 (portion of large diameter hole 17), which hypothetically extends toward the inner side of the accommodation recess 15. Thus, the engagement pin 25, when pivoted about the center axis O1, does not engage with the first engagement pieces 13a formed in the switching output shaft 13.

Further, the distal end portion of the engagement pin 25 is formed so that when the first stopper surface 21 is in contact with the stopper wall 16, the engagement pin 25 moves across a portion of the large diameter hole 17 through the pin inlet 18 to contact the switching output shaft 13. Thus, the engagement pin 25 engages the first engagement piece 13a formed on the switching output shaft 13.

As shown in FIGS. 3, 5A, and 5B, the switching operation plate 20 includes spring accommodation holes 26 that lie and extend along a line connecting the engagement pin 25 and the center axis O1. A latching piece 27, projecting from the inner bottom surface of the accommodation recess 15, is inserted in the spring accommodation hole 26. When the first stopper surface 21 of the switching operation plate 20 is in contact with the stopper wall 16, the latching piece 27 is in contact with an inner surface of the spring accommodation hole 26 that is located at an outer side in the radial direction.

A first spring SP1 (third elastic member) is arranged between an inner surface of the spring accommodation hole 26 located at the inner side in the radial direction and the latching piece 27. The first spring SP1 applies elastic force to the switching operation plate 20 so that the switching operation plate 20 (engagement pin 25) is constantly biased toward the inner side in the radial direction. The switching operation plate 20 (engagement pin 25) is configured so that the first stopper surface 21 normally presses the stopper wall 16. Thus, the engagement pin 25 is normally engaged with the first engagement piece 13a of the switching output shaft 13.

When the switching wheel main body 11 rotates, the switching operation plates 20 are rotated about the center axis O1. Here, the engagement pins 25 of the switching operation plates 20 are engaged with the first engagement pieces 13a of the switching output shaft 13 due to the biasing force of the first springs SP1. Thus, the switching output shaft 13 also rotates together with the switching wheel main body 11.

The rotation of the switching operation plates 20 applies centrifugal force to the switching operation plate 20. The centrifugal force moves the switching operation plates 20 toward the outer side in the radial direction against the biasing force of the first springs SP1. As the centrifugal force increases, the first stopper surfaces 21 move away from the stopper wall 16, and the second stopper surfaces 22 move toward the arcuate surfaces 15b of the accommodation recesses 15. Thus, as the centrifugal force increases, the engagement pins 25 of the switching operation plates 20 are moved out of the pin inlets 18 and disengaged from the first engagement piece 13a.

Referring to FIG. 5A, the position of the engagement pin 25 of the switching operation plate 20 engaged with the first engagement piece 13a of the switching output shaft 13 due to the biasing force of the first spring SP1 is referred to as the engaged position. Referring to FIG. 5B, the position of the engagement pin 25 of the switching operation plate 20 disengaged from the first engagement piece 13a of the switching output shaft 13 is referred to as the disengaged position.

In the present embodiment, each engagement pin 25 is at the disengaged position shown in FIG. 5B when the rotation speed of the motor M (output shaft S and worm shaft 8) is higher than equal to a first rotation speed N1. More specifically, a predetermined centrifugal force (first centrifugal force) is applied to the switching operation plate 20 when the switching wheel main body 11 rotates at a reduced rotation speed, which is obtained by reducing the rotation of the motor M rotating at the first rotation speed N1 by the speed reduction ratio R1. Thus, the engagement pin 25 is moved to the disengaged position against the elastic force of the first spring SP1.

Control Plate 30

Figure 6:
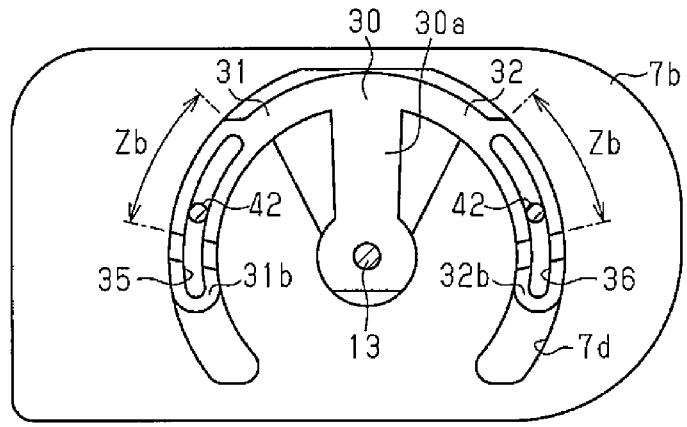
FIG. 6 is a diagram showing a control plate of FIG. 3 arranged at a central position.

As shown in FIGS. 3 and 6, a control plate 30 is fixed to the lower end portion of the switching output shaft 13. As shown in FIG. 6, the control plate 30 includes a movable plate portion 30a, which has a basal end portion fixed to the switching output shaft 13, and first and second control plate portions 31 and 32, which extend from the two sides of a distal end portion of the movable plate portion 30a and are arcuate to have the form of a quarter of a circle.

As shown in FIG. 6, the control plate 30 is accommodated in a guide recess 7d formed in the inner surface of the rear wall 7b of the case housing 7. The guide recess 7d is shaped so that the movable plate portion 30a and the first and second control plate portions 31 and 32 are allowed to pivot when the basal end portion of the movable plate portion 30a is pivoted about the pivot center. More specifically, the guide recess 7d includes an open space in which the movable plate portion 30a is oscillated about the center axis O1 and open spaces in which the first and second control plate portions 31 and 32 are pivoted about the center axis O1.

The depth of the guide recess 7d is set to be equal to or slightly greater than the thickness of the control plate 30. Thus, the movable plate portion 30a of the control plate 30 is arranged in the guide recess 7d with the basal end portion fixed to the switching output shaft 13. The upper surface of the movable plate portion 30a is substantially flush with the inner surface of the rear wall 7b.

Figure 8:
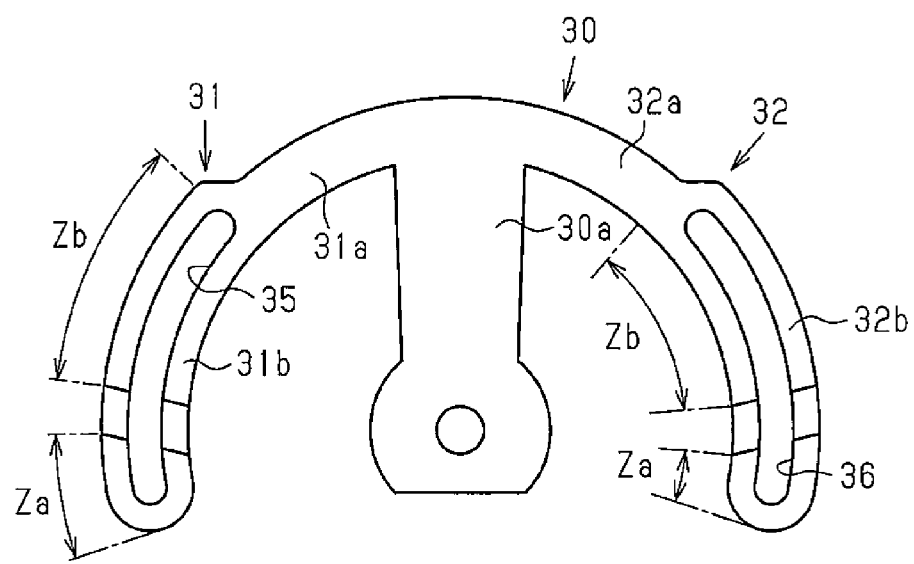
FIG. 8 is a front view showing the control plate of FIG. 6.
Figure 9:
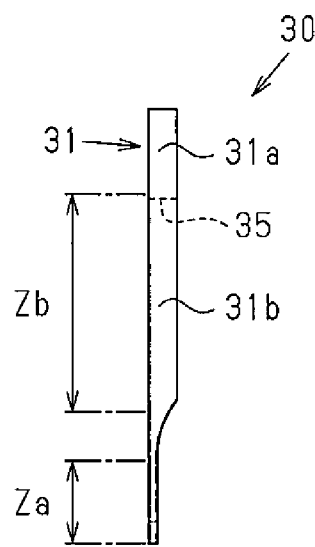
FIG. 9 is a side view showing the control plate of FIG. 8.

As shown in FIG. 8, the first and second control plate portions 31 and 32, which have the same shape and are symmetrical in the sideward direction, respectively include basal end arm portions 31a and 32a and control portions 31b and 32b extending from the basal end arm portions 31a and 32a. As shown in FIG. 9, each of the control portions 31b and 32b includes a basal end portion and a distal end portion, which is thinner than the basal end portion. The thin distal end portion is referred to as a thin region Za and the thick basal end portion (having the same thickness as the movable plate portion 30a) is referred to as a thick region Zb. The thin region Za is formed by cutting the upper surface of each of the control portions 31b and 32b, that is, the upper surface that does not contact the inner bottom surface of the guide recess 7d.

Thus, the upper surface of the thin region Za is not flush with the inner surface of the rear wall 7b and is located in the guide recess 7d. In contrast, the upper surface of the thick region Zb is substantially flush with the inner surface of the rear wall 7b. A gradually inclined surface connects the upper surfaces of the thick region Zb and the thin region Za.

Figure 7A:
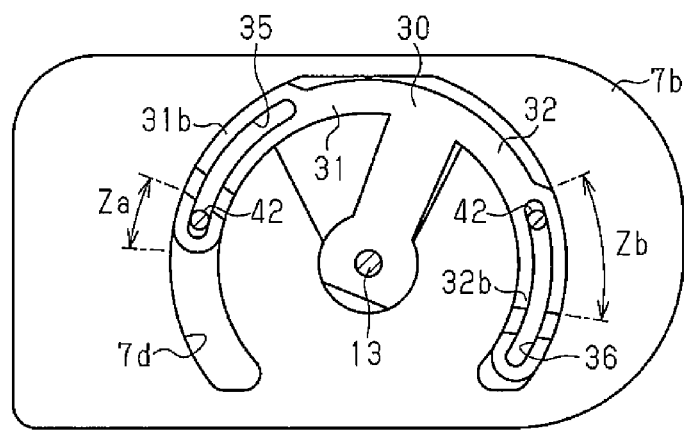
FIG. 7A is a diagram showing the control plate of FIG. 6 arranged at a right pivot position.
Figure 7B:
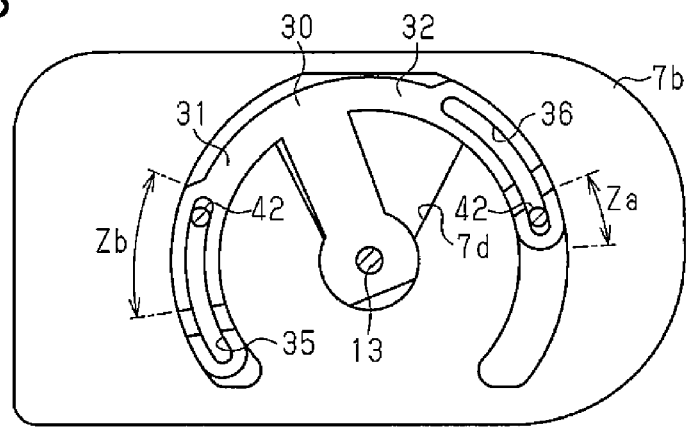
FIG. 7B is a diagram showing the control plate of FIG. 6 arranged at a left pivot position.

As shown in FIGS. 6 to 7B, the control portions 31b and 32b include arcuate release holes 35 and 36. Support shafts 42 of the first and second pinion drive mechanisms A and B (described later) are inserted through the release holes 35 and 36. The release holes 35 and 36 extend through the control portions 31b and 32b. When the switching output shaft 13 rotates (pivots) in the forward and reverse directions, the control plate 30 is pivoted within a range shown by FIGS. 7A and 7B.

The position of the control plate 30 shifted in the counterclockwise direction as viewed in FIG. 7B is referred to as the left pivot position (second pivot position). The position of the control plate 30 shifted in the clockwise direction as shown in FIG. 7A is referred to as the right pivot position (third pivot position). The position of the control plate 30 when the movable plate portion 30a extends orthogonal to the worm shaft 8 as shown in FIG. 6 is referred to as the central position (first pivot position).

First Pinion Drive Mechanism A

The first pinion drive mechanism A that drives the sunshade 4 will now be described with reference to FIG. 4.

Figure 4:
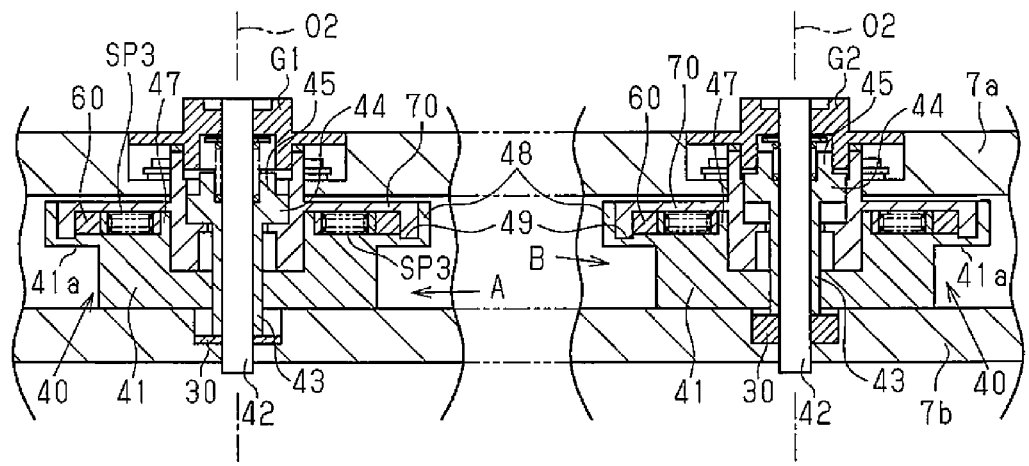
FIG. 4 is a cross-sectional view showing first and second pinion drive mechanisms in the clutched motor of FIG. 2.
Figure 10A:
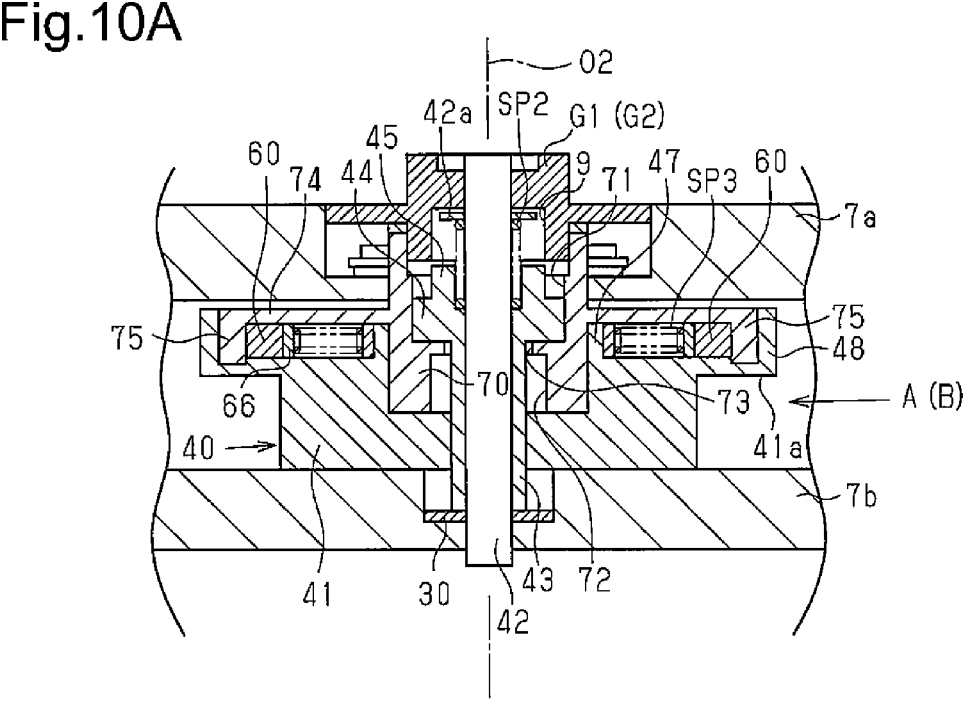
FIG. 10A is a diagram showing a tubular output shaft of FIG. 4 located at a lower elevation.
Figure 10B:
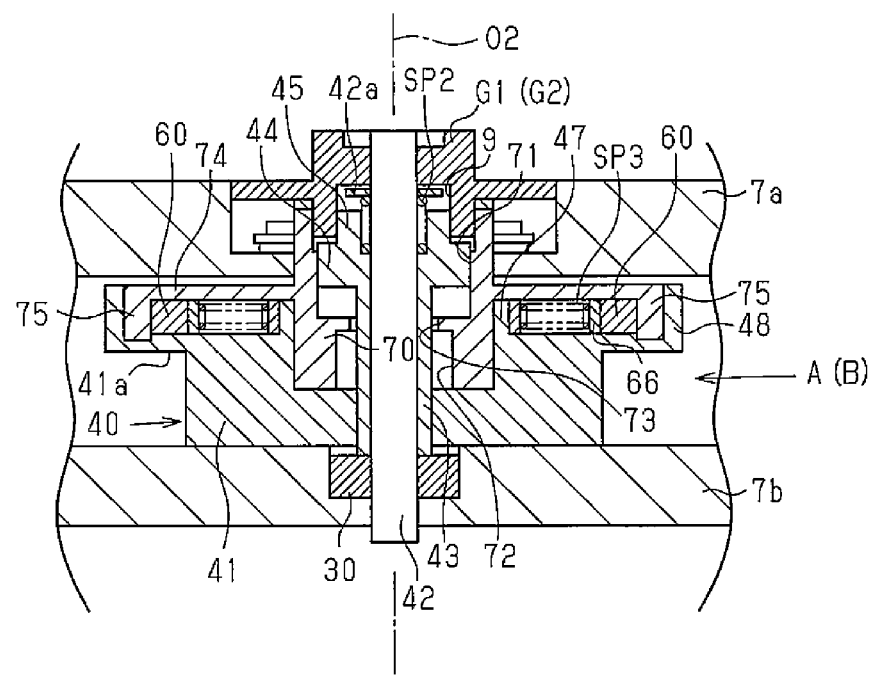
FIG. 10B is a diagram showing the tubular output shaft of FIG. 10A located at an upper elevation.

As shown in FIGS. 2 and 4, the first pinion drive mechanism A includes a driving worm wheel 40 (first and second rotating bodies) engaged with the worm shaft 8 and rotated in the forward and reverse directions. As shown in FIGS. 4, 10A and 10B, the driving worm wheel 40 includes a driving wheel main body 41 supported to be rotatable relative to a double shaft portion including the support shaft 42 and a tubular output shaft 43 (first and second tubular output shafts).

The basal end portion of the support shaft 42 is inserted through and fixed to the rear wall 7b of the case housing 7 so as to be non-rotatable relative to the rear wall 7b of the case housing 7. The distal end portion of the support shaft 42 rotatably supports the first pinion G1. The first pinion G1 is supported to be rotatable relative to the front wall 7a of the case housing 7.

More specifically, the basal end portion of the support shaft 42 extends through the release hole 35 of the first control plate portion 31, which is arranged in the guide recess 7d, and is fixed to the rear wall 7b. The diameter of the support shaft 42 is smaller than the width of the arcuate release hole 35. The support shaft 42 does not restrict the pivoting of the first control plate portion 31. The release hole 35 is configured so that when the control plate 30 is at the central position, the support shaft 42 is located on the thick region Zb near the inclined surface. Accordingly, the support shaft 42 allows the control plate 30 to be pivoted toward the left and the right pivot positions.

Tubular Output Shaft 43

As shown in FIG. 4, the support shaft 42, which extends through the inner side of the tubular output shaft 43, supports the tubular output shaft 43 to be rotatable and movable in the axial direction. A lower end surface of the tubular output shaft 43 is in contact with the upper surface of the control portion 31b of the first control plate portion 31. An outer diameter of the lower end portion of the tubular output shaft 43 is set to be small enough so that the lower end portion can be arranged in the guide recess 7d.

An upper portion of the tubular output shaft 43 defines a head portion 44 having a large diameter. The head portion 44 has a flat upper surface on which an annular wall 45 is formed. The annular wall 45 surrounds the support shaft 42 and is separated from the support shaft 42 by a fixed distance. The formation of the annular wall 45 defines an open space with an inner circumferential surface of the annular wall 45, the upper surface of the head portion 44 at the inner side of the annular wall 45, and the circumferential surface of the support shaft 42 (refer to FIGS. 10A and 10B). A second spring SP2 is arranged in the open space.

In detail, the second spring SP2 is arranged between a retainer piece 42a, which is attached to the support shaft 42, and the upper surface of the head portion 44 at the inner side of the annular wall 45. The second spring SP2 constantly applies downward biasing force to the tubular output shaft 43. The lower end surface of the tubular output shaft 43 constantly presses the upper surface of the control portion 31b of the first control plate portion 31.

The lower end portion of the second spring SP2 and the upper surface of the head portion 44 at the inner side of the annular wall 45 contact each other in a movable manner. Further, the lower end surface of the tubular output shaft 43 and the upper surface of the control portion 31b of the first control plate portion 31 contact each other in a movable manner.

Thus, when the lower end surface of the tubular output shaft 43 is in contact with the upper surface of the thick region Zb of the control portion 31b, the tubular output shaft 43 is arranged at an upper position. When the lower end surface of the tubular output shaft 43 is in contact with the upper surface of the thin region Za of the control portion 31b, the tubular output shaft 43 is arranged at a lower position.

FIG. 10B shows the tubular output shaft 43 located at the upper position, which is referred to as the upper elevation. FIG. 10A shows the tubular output shaft 43 located at the lower position, which is referred to as the lower elevation.

Figure 12:
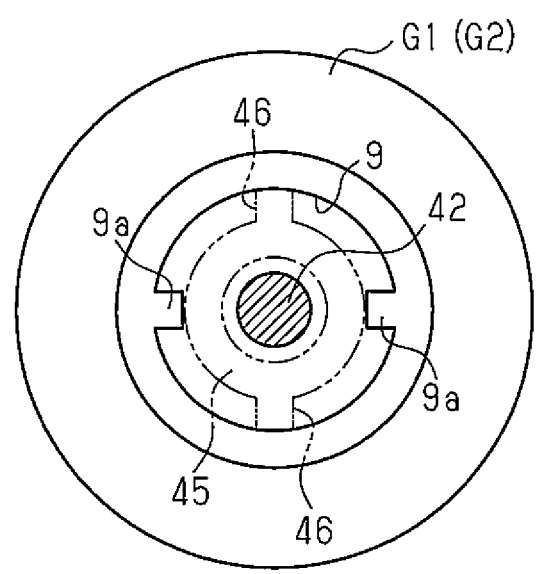
FIG. 12 is a front view showing a first pinion (second pinion) as viewed from a case housing and illustrating third engagement piece formed in an reception recess of the first pinion (second pinion) of FIG. 11A.

As shown by the double-dashed lines in FIG. 12, two second engagement pieces 46 are formed on the outer circumference of the annular wall 45, which is formed on the head portion 44 of the tubular output shaft 43. The second engagement pieces 46 extend toward the outer side in the radial direction. The two second engagement pieces 46 are formed on opposite sides of the center axis O2.

When the tubular output shaft 43 is located at the upper elevation, the annular wall 45, which includes the second engagement pieces 46, is arranged at a position where the annular wall 45 is inserted into a reception recess 9 formed in the first pinion G1 at a position corresponding to the front wall 7a. When the tubular output shaft 43 is located at the lower elevation, the annular wall 45, which includes the second engagement pieces 46, is arranged outside the reception recess 9.

As shown in FIGS. 4, 10A and 10B, the reception recess 9 has a circular cross-sectional shape in a plan view. The support shaft 42 extends through a central portion of an inner bottom surface in the reception recess 9. The first pinion G1 is supported to be rotatable relative to the support shaft 42.

As shown in FIG. 12, two third engagement pieces 9a are formed on the inner circumferential surface of the reception recess 9 at opposing positions. The third engagement pieces 9a extend toward the inner side in the radial direction. If the tubular output shaft 43 is rotated when the annular wall 45 including the second engagement pieces 46 is inserted into the reception recess 9 as shown by the double-dashed lines in FIG. 12, the second engagement piece 46 rotates about the center axis O2 and engages the third engagement pieces 9a of the reception recess 9 in the circumferential direction thereby rotating the first pinion G1 is rotated.

If the annular wall 45 including the second engagement pieces 46 is arranged outside the reception recess 9, the second engagement pieces 46 do not engage the third engagement pieces 9a even when the tubular output shaft 43 is rotated. Thus, the first pinion G1 does not rotate.

Driving Wheel Main Body 41

As shown in FIGS. 4, 10A and 10B, the tubular output shaft 43 extends through the driving wheel main body 41. The tubular output shaft 43 rotatably supports the driving wheel main body 41 and is movable in the axial direction relative to the rotating driving wheel main body 41.

The driving wheel main body 41 includes an upper outer circumferential portion on which a flange 41a is formed. Gear teeth, which are engaged with the worm shaft 8, are formed on the outer circumferential surface of the upper outer circumferential portion of the driving wheel main body 41, excluding the flange 41a. Thus, the rotation of the worm shaft 8 in the forward and reverse directions rotates the driving wheel main body 41 about the center axis O2 of the support shaft 42 in the forward and reverse directions in the case housing 7.

In the present embodiment, a speed reduction ratio R2, which is the ratio of the rotation speed of the driving wheel main body 41 relative to the rotation speed of the worm shaft 8 (output shaft S), is set in advance.

Figure 11A:
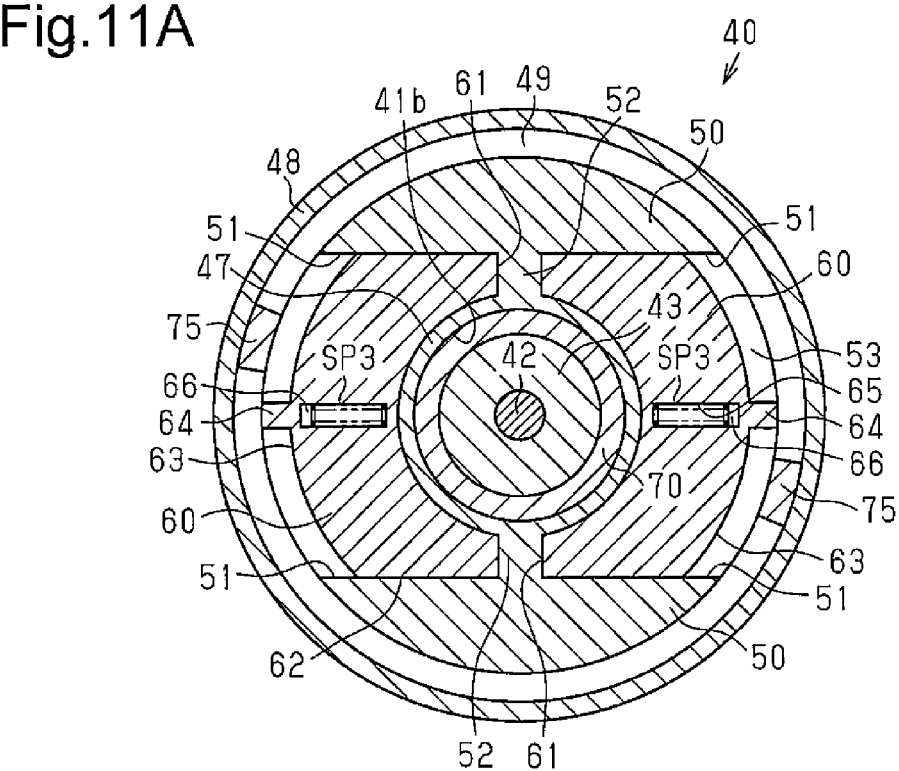
FIG. 11A is a diagram showing an engagement pin of a driving operation plate of FIG. 10A located at a non-coupled position.
Figure 11B:
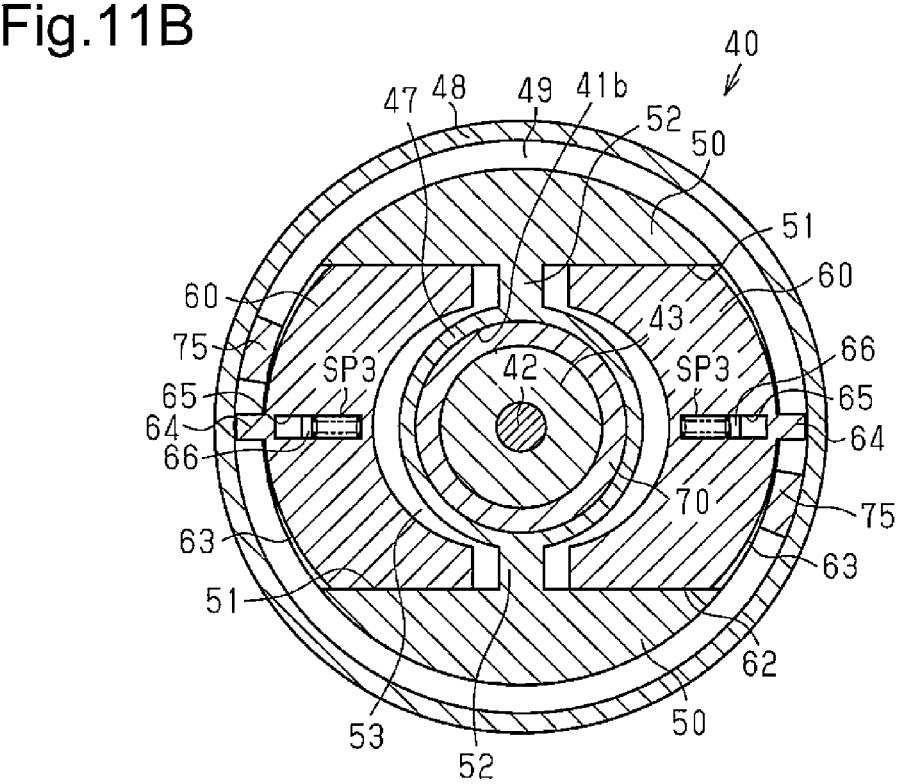
FIG. 11B is a diagram showing the engagement pin of the driving operation plate of FIG. 11A located at a coupled position.

As shown in FIGS. 4, 11A and 11B, an accommodation recess 41b having a circular cross-sectional shape in a plan view is formed in a center portion of the upper surface of the driving wheel main body 41. An annular inner wall 47 that surrounds the accommodation recess 41b and extends upward is formed on the upper surface of the driving wheel main body 41. An annular outer wall 48 extending upward is formed in an outer circumferential portion of the flange 41a on the upper surface of the driving wheel main body 41.

An annular guide groove 49 that has a constant width and extends along the inner side of the outer wall 48 is formed on the upper surface of the driving wheel main body 41.

As shown in FIGS. 11A and 11B, two guide walls 50, which are arranged on opposite sides of the center axis O2, are formed on the upper surface of the driving wheel main body 41. The guide walls 50 extend from the upper surface of the driving wheel main body 41. Outer surfaces of the two guide walls 50 in the radial direction are flush with the radially inner side surface of the guide groove 49 that extends along the inner side of the outer wall 48. The two guide walls 50 include flat surfaces (guide surfaces 51) that face each other and extend parallel to each other.

The two guide walls 50 are each coupled to the inner wall 47 by a stopper wall 52, which is arranged at a middle portion of the guide wall 50. Thus, each of the two opposing guide surfaces 51 facing each other is separated into two by the stopper wall 52.

Two accommodation recesses 53 are defined on the upper surface of the driving wheel main body 41 by the inner wall 47, the two guide walls 50, and the stopper walls 52. A portion of each of the two accommodation recesses 53 at the outer side in the radial direction (side opposite to the stopper wall 52), that is, a portion facing the outer wall 48 (guide groove 49) is open toward the guide groove 49.

Driving Operation Plate 60

The two accommodation recesses 53 each accommodate a driving operation plate 60 (first and second centrifugal clutches, first and second driving operation members). The radially inner side of the driving operation plate 60 defines a stopper surface 61 that comes into contact with the inner wall 47 and the stopper walls 52. The two sides of each driving operation plate 60 define contact surfaces 62 that contact and slide along the guide surfaces 51 of the two guide walls 50 that are each separated into two. Thus, the driving operation plate 60 is movable in the radial direction along the guide surfaces 51 and rotated integrally with the driving wheel main body 41.

An arcuate surface 63 formed by the radially outer side of the driving operation plate 60 has a larger curvature than the outer circumferential rim of the upper surface of the driving wheel main body 41. When the stopper surface 61 is in contact with the inner wall 47 and the side surfaces of the stopper walls 52, the arcuate surface 63 is located further radially inward from the guide groove 49, and the two ends of the arcuate surface 63 are located farthest from the guide groove 49.

Engagement pins 64 (first and second engaging members), projecting toward the outer side in the radial direction, are formed at the central positions of the arcuate surfaces 63. When the stopper surface 61 is in contact with the inner wall 47 and the stopper walls 52, the engagement pins 64 are located at the radially inner side of the guide groove 49. When the driving operation plate 60 moves toward the outer side in the radial direction, the engagement pins 64 move across the guide groove 49 and contact the outer wall 48. Thus, the driving operation plate 60 is accommodated in the accommodation recess 53 so as to be movable between the position where the engagement pins 64 are in contact with the outer wall 48 and the position where the engagement pins 64 are arranged at the radially inner side of the guide groove 49 and to be rotatable integrally with the driving wheel main body 41.

A spring accommodation hole 65, extending along a line extending from the engagement pins 64 to the center axis O2, is formed in the driving operation plate 60. A latching piece 66, projecting from the upper surface of the driving wheel main body 41, is arranged in the spring accommodation hole 65. When the stopper surface 61 is in contact with the inner wall 47 and the stopper walls 52, the latching piece 66 is in contact with the inner surface of the spring accommodation hole 65 that is located at the outer side in the radial direction.

In the spring accommodation hole 65, a third spring SP3 (first and second elastic members) is arranged between the inner surface of the spring accommodation hole 65 located at the inner side in the radial direction and the latching piece 66. The third spring SP3 applies elastic force to the driving operation plate 60 so that the driving operation plate 60 is constantly biased toward the inner side in the radial direction. When the driving operation plate 60 receives the elastic force from the third spring SP3, the stopper surface 61 presses the inner wall 47 and the stopper walls 52. This positions the engagement pins 64 at the inner side of the guide groove 49 in the radial direction. When the driving wheel main body 41 rotates, the driving operation plate 60, which is pressed against the inner wall 47 and the stopper walls 52 by the third spring SP3, rotates about the center axis O2.

The rotation applied centrifugal force to the driving operation plate 60. The centrifugal force applies force to the driving operation plate 60 and moves the driving operation plate 60 toward the outer side in the radial direction against the biasing force of the third spring SP3. Thus, as the centrifugal force increases, the driving operation plate 60 moves along the guide surfaces 51 to a position where the stopper surface 61 is separated from the inner wall 47 and the stopper walls 52. More specifically, as the centrifugal force increases, the engagement pins 64 move across the guide groove 49 in a direction in which the engagement pins 64 contact the outer wall 48.

The position of the driving operation plate 60 when the engagement pins 64 are in contact with the outer wall 48 as shown in FIG. 11B is referred to as the coupled position. The position of the driving operation plate 60 when the engagement pins 64 are separated from the guide groove 49 are retracted toward the inner side in the radial direction as shown in FIG. 11A is referred to as the non-coupled position.

In the present embodiment, when the rotation speed of the motor M (output shaft S and worm shaft 8) becomes higher than or equal to a second rotation speed N2, which is higher than the first rotation speed N1, the driving operation plate 60 is moved to the coupled position as shown in FIG. 11B. More specifically, when the rotation speed of the motor M, which is the second rotation speed N2, is reduced by the speed reduction ratio R2 so that the driving wheel main body 41 rotates at the reduced rotation speed, the driving operation plate 60 receives predetermined centrifugal force (second centrifugal force). In this case, the driving operation plate 60 is moved to the coupled position against the elastic force of the third spring SP3.

Driven Body 70

As shown in FIGS. 10A and 10B, a driven body 70 (first and second centrifugal clutches, first and second driven bodies) is fitted to the accommodation recess 41b of the driving wheel main body 41 so as to be rotatable about the center axis O2 relative to the accommodation recess 41b. A large diameter recess 71 having a large diameter and a small diameter recess 72 having a small diameter are respectively formed in upper and lower surfaces of the driven body 70 in the axial direction. A through hole 73 is extends through the central portions of the bottom surfaces of the large diameter recess 71 and the small diameter recess 72.

The tubular output shaft 43 extends through the through hole 73 and is rotatable and movable in the axial direction relative to the support shaft 42. The tubular output shaft 43 is coupled to the through hole 73 in a non-rotatable manner and supported by the through hole 73 to be movable in the axial direction.

Thus, the tubular output shaft 43 is coupled to rotate integrally with the driven body 70 and be movable in the axial direction relative to the driven body 70.

When the tubular output shaft 43 is located at the lower elevation as shown in FIG. 10A, a lower surface of the head portion 44 of the tubular output shaft 43 is in contact with the bottom surface of the large diameter recess 71 formed in the upper surface of the driven body 70. When the tubular output shaft 43 is located at the upper elevation as shown in FIG. 10B, the lower surface of the head portion 44 of the tubular output shaft 43 moves away from the bottom surface of the large diameter recess 71 formed in the upper surface of the driven body 70.

A flange 74 is formed on an outer circumferential surface of the driven body 70. Two fourth engagement pieces 75 (first and second engaged members), which extend downward, are formed on outer circumferential portion of the flange 74. The two fourth engagement pieces 75 are formed on opposite sides of the center axis O2 opposed to each other. Distal end portions of the two fourth engagement pieces 75 extend from the outer circumferential portion of the flange 74 and are arranged in the guide groove 49.

Thus, when the driving operation plate 60 is located at the coupled position as shown in FIG. 11B, the engagement pins 64 engage with the fourth engagement pieces 75. As a result, the driven body 70 receives rotational force of the driving wheel main body 41 and rotates together with the driving wheel main body 41. This rotates the tubular output shaft 43. Here, when the tubular output shaft 43 is located at the upper elevation, that is, when the annular wall 45 is inserted into the reception recess 9, the second engagement pieces 46 engage with the third engagement pieces 9a and rotates the first pinion G1.

When the driving operation plate 60 is arranged at the non-coupled position as shown in FIG. 11A, the engagement pins 64 are disengaged from the fourth engagement pieces 75. As a result, the driven body 70 does not receive rotational force from the driving wheel main body 41, and the driven body 70 is in a non-rotating state. As a result, the tubular output shaft 43 is also in a non-rotating state.

Second Pinion Drive Mechanism B

Next, the second pinion drive mechanism B that drives the roof glass 3 will be described. The first pinion drive mechanism A and the second pinion drive mechanism B have the same configuration. The first pinion drive mechanism A and the second pinion drive mechanism B are arranged at symmetric positions on opposite side of the switching control mechanism C. Thus, for the sake of brevity, the components of the second pinion drive mechanism B will be briefly described using the same names and reference numerals as the corresponding components in the first pinion drive mechanism A.

The lower end surface of the tubular output shaft 43 of the second pinion drive mechanism B comes into contact with the upper surface (control surface) of the control portion 32b of the second control plate portion 32. When the lower end surface of the tubular output shaft 43 is in contact with the upper surface of the thick region Zb of the control portion 32b of the second control plate portion 32, the tubular output shaft 43 is located at the upper elevation. When the lower end surface of the tubular output shaft 43 is in contact with the upper surface of the thin region Za of the control portion 32b of the second control plate portion 32, the tubular output shaft 43 is located at the lower elevation.

When the tubular output shaft 43 of the second pinion drive mechanism B rotates at the upper elevation, the second pinion G2 rotates. When the tubular output shaft 43 of the second pinion drive mechanism B rotates at the lower elevation, the second pinion G2 does not rotate.

Thus, when the control plate 30 is arranged at the central position by the switching control mechanism C, the tubular output shafts 43 of the first and second pinion drive mechanisms A and B are located at the upper elevation. Accordingly, when the tubular output shafts 43 of the first and second pinion drive mechanisms A and B are rotated in this state, the first and second pinions G1 and G2 are rotated in the same direction. Thus, the roof glass 3 and the sunshade 4 may be opened and closed.

When the control plate 30 is arranged at the left pivot position by the switching control mechanism C, the tubular output shaft 43 of the first pinion drive mechanism A is located at the upper elevation, and the tubular output shaft 43 of the second pinion drive mechanism B is located at the lower elevation. Thus, when the tubular output shafts 43 of the first and second pinion drive mechanisms A and B are rotated in this state, only the first pinion G1 rotates. The second pinion G2 does not rotate. Thus, only the sunshade 4 may be opened and closed.

When the control plate 30 is arranged at the right pivot position by the switching control mechanism C, the tubular output shaft 43 of the first pinion drive mechanism A is located at the lower elevation, and the tubular output shaft 43 of the second pinion drive mechanism B is located at the upper elevation. Thus, when the tubular output shafts 43 of the first and second pinion drive mechanisms A and B are rotated in this state, only the second pinion G2 rotates. The first pinion G1 does not rotate. Thus, only the roof glass 3 can be opened and closed.

ECU 80

As shown in FIG. 2, an electronic control unit (ECU) 80, which serves as a control circuit, is arranged in the case housing 7 of the reduction-clutch unit 6.

The ECU 80 is a control circuit that controls the rotation of the motor M and is configured by a microcomputer. The ECU 80 receives an operation signal from a first operation switch SW1, which is used to open and close the sunshade, a second operation switch SW2, which is used to open and close the roof glass, and a third operation switch SW3, which is used to open and close the roof glass and the sunshade. The first to third operations switches SW1 to SW3 are located near the driver seat.

When receiving an opening/closing operation signal or an operation stopping signal from the first operation switch SW1, the ECU 80 controls the motor M to perform or stop an opening/closing operation of the sunshade 4. When receiving an opening/closing operation signal or an operation stopping signal from the second operation switch SW2, the ECU 80 controls the motor M to perform or stop an opening/closing operation of the roof glass 3. When receiving an opening/closing operation signal or an operation stopping signal from the third operation switch SW3, the ECU 80 controls the motor M to perform or stop an opening/closing operation of both of the roof glass 3 and the sunshade 4.

When the first operation switch SW1 outputs an opening operation signal, the ECU 80 determines that an operation for opening the sunshade 4 has been requested, and first has the motor M generate rotation in the reverse direction. The ECU 80 controls the motor M to generate rotation at a speed lower than the first rotation speed N1 and pivot the control plate 30 from the central position to the left pivot position until the upper surface of the thin region Za of the second control plate portion 32 comes into contact with the lower end surface of the tubular output shaft 43 of the second pinion drive mechanism B. More specifically, the ECU 80 controls the motor M to generate rotation in the reverse rotation direction at a speed lower than the first rotation speed N1 until the control plate 30 reaches the left pivot position.

When the control plate 30 reaches the left pivot position, the ECU 80 first stops the motor M and then switches the rotation direction to the forward rotation direction. Here, the ECU 80 controls the motor M so that the rotation speed in the forward rotation direction increases to become greater than or equal to the first rotation speed N1 before the upper surface of the thin region Za of the second control plate portion 32 is separated from the lower end surface of the tubular output shaft 43 of the second pinion drive mechanism B. Then, the ECU 80 controls the motor M so that the rotation speed further becomes greater than or equal to the second rotation speed N2.

In contrast, when the first operation switch SW1 outputs a closing operation signal, the ECU 80 determines that an operation for closing the sunshade 4 has been requested and has the motor M generate rotation in the reverse direction.

More specifically, the ECU 80 has the motor M generate rotation in the reverse direction at a speed lower than the first rotation speed N1 and pivot the control plate 30 from the central position to the left pivot position. When the control plate 30 reaches the left pivot position and the upper surface of the thin region Za of the second control plate portion 32 comes into contact with the lower end surface of the tubular output shaft 43 of the second pinion drive mechanism B, the ECU 80 controls the motor M so that the rotation speed of the motor M becomes greater than or equal to the first rotation speed N1. Then, the ECU 80 controls the motor M so that the rotation speed becomes greater than or equal to the second rotation speed N2.

When the first operation switch SW1 outputs an operation stopping signal, the ECU 80 determines that the stopping of the opening/closing operation of the sunshade 4 has been requested and stops the motor M.

Here, the ECU 80 first stops the motor M and then rotates the motor M in the forward direction at a speed lower than the first rotation speed N1 so that the control plate 30 returns to the central position from the left pivot position. When the control plate 30 returns to the central position, the ECU 80 stops the motor M. Thus, when the first operation switch SW1, which has been outputting the opening operation signal, outputs the operation stopping signal, the ECU 80 has the motor M generate rotation in the forward rotation direction at a speed lower than the first rotation speed N1 and stops the motor M when the control plate 30 returns to the central position from the left pivot position. In the same manner, when the first operation switch SW1, which has been outputting the closing operation signal, outputs the operation stopping signal, the ECU 80 has the motor M generate rotation in the forward rotation direction at a speed lower than the first rotation speed N1 and stops the motor M when the control plate 30 returns to the central position from the left pivot position.

When the second operation switch SW2 outputs an opening operation signal, the ECU 80 determines that an operation for opening the roof glass 3 has been requested and has the motor M generate rotation in the forward direction.

More specifically, the ECU 80 has the motor M generate rotation in the forward direction at a rotation speed lower than the first rotation speed N1 to pivot the control plate 30 from the central position to the right pivot position. When the control plate 30 reaches the right pivot position and the upper surface of the thin region Za of the first control plate portion 31 comes into contact with the lower end surface of the tubular output shaft 43 of the first pinion drive mechanism A, the ECU 80 controls the motor M so that the rotation speed of the motor M becomes greater than or equal to the first rotation speed N1 and then further becomes greater than or equal to the second rotation speed N2.

When the second operation switch SW2 outputs a closing operation signal, the ECU 80 determines that an operation of closing the roof glass 3 has been requested, and first rotates the motor M in the forward direction. When the control plate 30 reaches the right pivot position and the upper surface of the thin region Za of the first control plate portion 31 comes into contact with the lower end surface of the tubular output shaft 43 of the first pinion drive mechanism A, the ECU 80 stops the motor M and then switches the rotation direction to the reverse rotation direction. Here, the ECU 80 controls the motor M so that the rotation speed in the reverse rotation direction increases and becomes greater than or equal to the first rotation speed N1 before the upper surface of the thin region Za of the first control plate portion 31 is separated from the lower end surface of the tubular output shaft 43 of the first pinion drive mechanism A. Then, the ECU 80 controls the motor M so that the rotation speed further becomes greater than or equal to the second rotation speed N2.

When the second operation switch SW2 outputs an operation stopping signal, the ECU 80 determines that an operation for stopping the opening/closing operation of the roof glass 3 has been requested and stops the motor M.

Here, the ECU 80 first stops the motor M and then rotates the motor M in the reverse direction at a speed lower than the first rotation speed N1 so that the control plate 30 returns to the central position from the right pivot position. When the control plate 30 returns to the central position, the ECU 80 stops the motor M. Thus, when the second operation switch SW2, which has been outputting the opening operation signal, outputs the operation stopping signal, the ECU 80 has the motor M generate rotation in the reverse rotation direction at a speed lower than the first rotation speed N1 and stops the motor M when the control plate 30 returns to the central position from the right pivot position. In the same manner, when the second operation switch SW2, which has been outputting the closing operation signal, outputs the operation stopping signal, the ECU 80 has the motor M generate rotation in the reverse rotation direction at a speed lower than the first rotation speed N1 and stops the motor M when the control plate 30 returns to the central position from the right pivot position.

When the third operation switch SW3 outputs an opening operation signal, the ECU 80 determines that an operation for simultaneously opening the roof glass 3 and the sunshade 4 has been requested and rotates the motor M in the forward direction. In addition, the ECU 80 controls the motor M so that the control plate 30 is pivoted from the central position to the right pivot position and so that the rotation speed of the motor M reaches the first rotation speed N1 before the upper surface of the thick region Zb of the first control plate portion 31 is separated from the lower end surface of the tubular output shaft 43 of the first pinion drive mechanism A.

When the rotation speed of the motor M in the forward rotation direction reaches the first rotation speed N1, the ECU 80 controls the motor M so that the rotation speed of the motor M in the forward rotation direction becomes greater than or equal to the second rotation speed N2.

In contrast, when the third operation switch SW3 outputs a closing operation signal, the ECU 80 determines that an operation for simultaneously closing the roof glass 3 and the sunshade 4 has been requested and rotates the motor M in the reverse direction. Further, the ECU 80 controls the motor M so that the rotation speed of the motor M reaches the first rotation speed N1 before the upper surface of the thick region Zb of the second control plate portion 32 is separated from the lower end surface of the tubular output shaft 43 of the second pinion drive mechanism B and the control plate 30 pivots from the central position to the left pivot position.

When the rotation speed of the motor M in the reverse rotation direction reaches the first rotation speed N1, the ECU 80 controls the motor M so that the rotation speed of the motor M in the reverse rotation direction becomes greater than or equal to the second rotation speed N2.

When the third operation switch SW3 outputs an operation stopping signal, the ECU 80 determines that an operation for stopping the opening/closing operation of the roof glass 3 and the sunshade 4 has been requested and stops the motor M.

Here, the ECU 80 first stops the motor M and then rotates the motor M at a speed lower than the first rotation speed N1 so that the control plate 30 returns to the central position. When the control plate 30 returns to the central position, the ECU 80 stops the motor M. Thus, when the third operation switch SW3, which has been outputting the opening operation signal, outputs the operation stopping signal, the ECU 80 has the motor M generate rotation in the reverse rotation direction at a speed lower than the first rotation speed N1 and stops the motors M when the control plate 30 returns to the central position. In contrast, when the third operation switch SW3, which has been outputting the closing operation signal, outputs the operation stopping signal, the ECU 80 has the motor M generate rotation in the forward rotation direction at a speed lower than the first rotation speed N1, and stops the motor M when the control plate 30 returns to the central position.

The operation of the present embodiment will now be described.

It is assumed that the roof glass 3 and the sunshade 4 are fully closed, and the motor M is stopped. In this state, the engagement pin 25 of the switching operation plate 20 of the switching control mechanism C is located at the engaged position and thus engaged with the first engagement piece 13a of the switching output shaft 13. The engagement pins 64 of the driving operation plate 60 of each of the first and second pinion drive mechanisms A and B are arranged at the non-coupled position and are disengaged from the fourth engagement pieces 75 of the driven body 70.

In this state, the control plate 30 is located at the central position, and the tubular output shafts 43 of the first and second pinion drive mechanisms A and B are located at the upper elevation. As a result, the second engagement pieces 46 of the tubular output shafts 43 are engaged with the third engagement pieces 9a formed in the reception recesses 9 of the first and second pinions G1 and G2.

Opening Operation of Sunshade 4

When an opening operation is performed with the first operation switch SW1 to open the sunshade 4, the ECU 80 receives an opening operation signal from the first operation switch SW1. Thus, the ECU 80 determines that the operation of opening the sunshade 4 has been requested and controls the motor M so that only the first pinion G1 rotates in the forward direction.

First, the ECU 80 controls the motor M so that the motor M generates rotation at a rotation speed lower than the first rotation speed N1 in the reverse direction. The control plate 30 is pivoted from the central position to the left pivot position by the rotation of the motor M in the reverse direction at a rotation speed lower than the first rotation speed N1.

Here, the rotation speed of the motor M is lower than the first rotation speed N1 and the engagement pin 25 of the switching control mechanism C is located at the engaged position and engaged with the first engagement piece 13a. The driving wheel main bodies 41 of the first and second pinion drive mechanisms A and B rotate in the reverse direction, but the tubular output shafts 43 do not rotate because the driving operation plates 60 of the first and second pinion drive mechanisms A and B remain at the non-coupled position.

When the control plate 30 pivots to the left pivot position and the upper surface of the thin region Za of the second control plate portion 32 comes into contact with the lower end surface of the tubular output shaft 43 of the second pinion drive mechanism B, the ECU 80 has the motor M generate rotation in the forward direction. The ECU 80 increases the rotation speed of the motor M to the first rotation speed N1 before the upper surface of the thin region Za of the pivoted second control plate portion 32 is separated from the lower end surface of the tubular output shaft 43 of the second pinion drive mechanism B.

In other words, when the tubular output shaft 43 of the second pinion drive mechanism B is located at the lower elevation so that the second engagement pieces 46 of the tubular output shaft 43 are disengaged from the third engagement pieces 9a of the second pinion G2, the ECU 80 has the motor M generate rotation in the forward direction so that the rotation speed quickly reaches the first rotation speed N1.

When the rotation speed of the motor M reaches the first rotation speed N1, the engagement pin 25 of the switching control mechanism C is located at the disengaged position and disengaged from the first engagement piece 13a. Furthermore, the rotation (pivoting) of the switching output shaft 13 is stopped, and the control plate 30 stops at the left pivot position.

The ECU 80 controls the motor M so that the rotation speed of the motor M in the forward rotation direction increases from the first rotation speed N1 to the second rotation speed N2 or higher.

When the rotation speed reaches the second rotation speed N2, the driving operation plate 60 of each of the first and second pinion drive mechanisms A and B is located at the coupled position, the engagement pins 64 are engaged with the fourth engagement pieces 75, and the tubular output shafts 43 of the first and second pinion drive mechanisms A and B are rotated in the forward direction.

Here, the tubular output shaft 43 of the first pinion drive mechanism A is located at the upper elevation. Thus, rotational force is transmitted from the tubular output shaft 43 to the first pinion G1. Further, the first pinion G1 is rotated in the forward direction so that the sunshade 4 moves in the opening direction.

The tubular output shaft 43 of the second pinion drive mechanism B is located at the lower elevation. Thus, rotational force is not transmitted from the tubular output shaft 43 to the second pinion G2. Further, the second pinion G2 remains stationary.

When the sunshade 4 moves to the desired open position, the stopping operation is performed with the first operation switch SW1. Then, the ECU 80 stops the motor M so that the sunshade 4 stops at the desired position. Here, the ECU 80 stops the motor M and then has the motor M generate rotation in the forward rotation direction at a speed lower than the first rotation speed N1. Subsequently, the ECU 80 stops the motor M when the control plate 30 returns to the central position from the left pivot position.

This allows ambient light to enter the vehicle interior.

Opening Operation of Roof Glass 3

If the second operation switch SW2 is operated to open the roof glass 3 when the sunshade 4 is open, the ECU 80 receives an opening operation signal from the second operation switch SW2. Thus, the ECU 80 determines that the operation for opening the roof glass 3 has been requested and controls the motor M so that only the second pinion G2 rotates in the forward direction.

First, the ECU 80 controls the motor M so that the motor M generates rotation at a rotation speed lower than the first rotation speed N1 in the forward direction. The control plate 30 is pivoted from the central position to the right pivot position by the rotation of the motor M in the forward direction at a rotation speed lower than the first rotation speed N1.

Here, the rotation speed of the motor M is lower than the first rotation speed N1, and the engagement pin 25 of the switching control mechanism C is located at the engaged position and engaged with the first engagement piece 13a. The driving wheel main bodies 41 of the first and second pinion drive mechanisms A and B rotate in the forward direction. However, the driving operation plates 60 of the first and second pinion drive mechanisms A and B are in the non-coupled position. Thus, the tubular output shafts 43 do not rotate.

When the control plate 30 pivots to the right pivot position and the upper surface of the thin region Za of the first control plate portion 31 comes into contact with the lower end surface of the tubular output shaft 43 of the first pinion drive mechanism A, the ECU 80 controls the motor M so that the rotation speed of the motor M reaches the first rotation speed N1.

In other words, when the tubular output shaft 43 of the first pinion drive mechanism A is located at the lower elevation and the second engagement pieces 46 of the tubular output shaft 43 are disengaged from the third engagement pieces 9a of the first pinion G1, the ECU 80 has the motor M generate rotation in the forward direction so that the rotation speed reaches the first rotation speed N1.

When the rotation speed of the motor M reaches the first rotation speed N1, the engagement pin 25 of the switching control mechanism C is located at the disengaged position and disengaged from the first engagement piece 13a. Furthermore, the rotation (pivoting) of the switching output shaft 13 is stopped, and the control plate 30 stops at the right pivot position.

Then, the ECU 80 controls the motor M so that the rotation speed of the motor M in the forward rotation direction increases from the first rotation speed N1 to the second rotation speed N2 or higher.

When the rotation speed reaches the second rotation speed N2, the driving operation plate 60 of each of the first and second pinion drive mechanisms A and B is located at the coupled position, the engagement pins 64 engage the fourth engagement pieces 75, and the tubular output shafts 43 of the first and second pinion drive mechanisms A and B are rotated in the forward direction.

Here, the tubular output shaft 43 of the second pinion drive mechanism B is located at the upper elevation. Thus, the rotational force is transmitted from the tubular output shaft 43 to the second pinion G2, and the second pinion G2 is rotated in the forward direction so that the roof glass 3 moves in the opening direction.

Further, the tubular output shaft 43 of the first pinion drive mechanism A is located at the lower elevation. Thus, rotational force is not transmitted from the tubular output shaft 43 to the first pinion G1, and the first pinion G1 remains stationary.

When the roof glass 3 moves to the desired open position, the stopping operation is performed with the second operation switch SW2. Then, the ECU 80 stops the motor M so that the roof glass 3 stops at the desired position. Here, the ECU 80 stops the motor M, and then rotates the motor M in the reverse rotation direction at a speed lower than the first rotation speed N1. Then, the ECU 80 stops the motor M when the control plate 30 returns to the central position from the right pivot position.

This allows ambient light and fresh air to enter the vehicle interior.

Closing Operation of Roof Glass 3

When the closing operation is performed with the second operation switch SW2 to close the roof glass 3 from the state described above, the ECU 80 receives a closing operation signal from the second operation switch SW2. Thus, the ECU 80 determines that the operation for closing the roof glass 3 has been requested, and controls the motor M so that only the second pinion G2 is rotated in the reverse direction.

First, the ECU 80 controls the motor M so that the motor M generates rotation at a rotation speed lower than the first rotation speed N1 in the forward direction. The control plate 30 is pivoted from the central position to the right pivot position by the rotation of the motor M in the forward direction at a rotation speed lower than the first rotation speed N1.

Here, the rotation speed of the motor M is lower than the first rotation speed N1, and the engagement pin 25 of the switching control mechanism C is located at the engaged position and engaged with the first engagement piece 13a. When the driving wheel main bodies 41 of the first and second pinion drive mechanisms A and B are rotated in the forward direction, the driving operation plates 60 of the first and second pinion drive mechanisms A and B are in the non-coupled position. Thus, the tubular output shafts 43 are not rotated.

When the control plate 30 pivots to the right pivot position and the upper surface of the thin region Za of the first control plate portion 31 comes into contact with the lower end surface of the tubular output shaft 43 of the first pinion drive mechanism A, the ECU 80 has the motor M generate rotation in the reverse direction. Here, the ECU 80 increases the rotation speed of the motor M to the first rotation speed N1 before the upper surface of the thin region Za of the pivoted first control plate portion 31 is separated from the lower end surface of the tubular output shaft 43 of the first pinion drive mechanism A.

In other words, when the tubular output shaft 43 of the first pinion drive mechanism A is located at the lower elevation and the second engagement pieces 46 of the tubular output shaft 43 are disengaged from the third engagement pieces 9a of the first pinion G1, the ECU 80 has the motor M generate rotation in the reverse direction so that the rotation speed quickly reaches the first rotation speed N1.

When the rotation speed of the motor M reaches the first rotation speed N1, the engagement pin 25 of the switching control mechanism C is located at the disengaged position and disengaged from the first engagement piece 13a. Furthermore, the rotation (pivoting) of the switching output shaft 13 is stopped, and the control plate 30 stops at the right pivot position.

The ECU 80 controls the motor M so that the rotation speed of the motor M in the reverse direction increases from the first rotation speed N1 to the second rotation speed N2 or higher.

When the rotation speed reaches the second rotation speed N2, the driving operation plate 60 of each of the first and second pinion drive mechanisms A and B is located at the coupled position and the engagement pins 64 are engaged with the fourth engagement pieces 75, and the tubular output shafts 43 of the first and second pinion drive mechanisms A and B are rotated in the reverse direction.

Here, the tubular output shaft 43 of the second pinion drive mechanism B is located at the upper elevation. Thus, the rotational force is transmitted from the tubular output shaft 43 to the second pinion G2, and the second pinion G2 is rotated in the reverse direction so that the roof glass 3 moves in the closing direction.

The tubular output shaft 43 of the first pinion drive mechanism A is located at the lower elevation. Thus, rotational force is not transmitted from the tubular output shaft 43 to the first pinion G1, and the first pinion G1 remains stationary.

When the roof glass 3 is moved to, for example, the fully closed position, the stopping operation is performed with the second operation switch SW2. Then, the ECU 80 stops the motor M so that the roof glass 3 stops at the fully closed position. Here, the ECU 80 stops the motor M, and then rotates the motor M in the reverse rotation direction at a speed lower than the first rotation speed N1. Then, the ECU 80 stops the motor M when the control plate 30 returns to the central position from the right pivot position.

This blocks fresh air and allows only ambient light to enter the vehicle interior.

Closing Operation of Sunshade 4

When the closing operation is performed with the first operation switch SW1 to close the sunshade 4 from the state described above, the ECU 80 receives the closing operation signal from the first operation switch SW1. Thus, the ECU 80 determines that the operation for closing the sunshade 4 has been requested and controls the motor M so that only the first pinion G1 rotates in the reverse direction.

First, the ECU 80 controls the motor M so that the motor M generates rotation at a rotation speed lower than the first rotation speed N1 in the reverse direction. The control plate 30 is pivoted from the central position to the left pivot position by the rotation of the motor M in the reverse direction at a rotation speed lower than the first rotation speed N1.

Here, the rotation speed of the motor M is lower than the first rotation speed N1 and the engagement pin 25 of the switching control mechanism C is located at the engaged position and engaged with the first engagement piece 13a. The driving wheel main bodies 41 of the first and second pinion drive mechanisms A and B are rotated in the reverse direction. However, the driving operation plates 60 of the first and second pinion drive mechanisms A and B are located at the non-coupled position. Thus, the tubular output shafts 43 are not rotated.

When the control plate 30 is pivoted to the left pivot position and the upper surface of the thin region Za of the second control plate portion 32 comes into contact with the lower end surface of the tubular output shaft 43 of the second pinion drive mechanism B, the ECU 80 controls the motor M so that the rotation speed of the motor M reaches the first rotation speed N1.

In other words, when the tubular output shaft 43 of the second pinion drive mechanism B is located at the lower elevation and the second engagement pieces 46 of the tubular output shaft 43 are disengaged from the third engagement pieces 9a of the second pinion G2, the ECU 80 has the motor M generate rotation in the reverse direction so that the rotation speed quickly reaches the first rotation speed N1.

When the rotation speed of the motor M reaches the first rotation speed N1, the engagement pin 25 of the switching control mechanism C is located at the disengaged position and disengaged from the first engagement piece 13a. Furthermore, the rotation (pivoting) of the switching output shaft 13 is stopped. This stops the control plate 30 at the left pivot position.

Next, the ECU 80 controls the motor M so that the rotation speed of the motor M in the reverse direction increases from the first rotation speed N1 to the second rotation speed N2 or higher.

When the rotation speed reaches the second rotation speed N2, the driving operation plate 60 of each of the first and second pinion drive mechanisms A and B is located at the coupled position, the engagement pins 64 are engaged with the fourth engagement pieces 75, and the tubular output shafts 43 of the first and second pinion drive mechanisms A and B are rotated in the reverse direction.

Here, the tubular output shaft 43 of the first pinion drive mechanism A is located at the upper elevation. Thus, the rotational force is transmitted from the tubular output shaft 43 to the first pinion G1. Further, the first pinion G1 is rotated in the reverse direction so that the sunshade 4 moves in the closing direction.

The tubular output shaft 43 of the second pinion drive mechanism B is located at the lower elevation. Thus, rotational force is not transmitted from the tubular output shaft 43 to the second pinion G2, and the second pinion G2 remains stationary.

When the sunshade 4 moves to the fully closed position, the stopping operation is performed with the first operation switch SW1. More specifically, the ECU 80 stops the motor M so that the sunshade 4 stops at the fully closed position. Here, the ECU 80 stops the motor M and then has the motor M generate rotation in the forward rotation direction at a speed lower than the first rotation speed N1. Then, the ECU 80 stops the motor M when the control plate 30 returns to the central position from the left pivot position.

This stops the entrance of ambient light and fresh air into the vehicle interior.

Opening Operation of Roof Glass 3 and Sunshade 4

When an opening operation is performed with the third operation switch SW3 to simultaneously open the roof glass 3 and the sunshade 4, the ECU 80 receives an opening operation signal from the third operation switch SW3. Thus, the ECU 80 determines that the operation for simultaneously opening the roof glass 3 and the sunshade 4 has been requested, and thus controls the motor M so that the first and second pinions G1 and G2 rotate in the forward direction.

First, the ECU 80 controls the motor M so that the motor M generates rotation at the first rotation speed N1 or higher in the forward direction before the lower end surface of the tubular output shaft 43 of the first pinion drive mechanism A is separated from the thick region Zb of the control portion 31b when the control plate 30 pivots from the central position. Thus, the pivoting of the control plate 30 stops when the control plate 30 is only slightly shifted from the central position.

As a result, the tubular output shafts 43 of the first and second pinion drive mechanisms A and B are located at the upper elevation, and the second engagement pieces 46 of the tubular output shafts 43 are engaged with the third engagement pieces 9a of the first and second pinions G1 and G2.

In this state, the ECU 80 controls the motor M so that the rotation speed of the motor M in the forward direction increases from the first rotation speed N1 to the second rotation speed N2 or higher.

When the rotation speed reaches the second rotation speed N2, the driving operation plate 60 of each of the first and second pinion drive mechanisms A and B is located at the coupled position, the engagement pins 64 are engaged with the fourth engagement pieces 75, and the tubular output shafts 43 of the first and second pinion drive mechanisms A and B are rotated in the forward direction.

Here, the tubular output shafts 43 of the first and second pinion drive mechanisms A and B are located at the upper elevation. Thus, the first and second pinions G1 and G2 are rotated in the forward direction by the rotational force from the tubular output shafts 43. Further, the roof glass 3 and the sunshade 4 are moved in the opening direction by the forward rotation of the first and second pinions G1 and G2.

When the roof glass 3 and the sunshade 4 move to the desired open positions, the operation for stopping the third operation switch SW3 is performed. More specifically, the ECU 80 stops the motor M so that the roof glass 3 and the sunshade 4 stop at the fully closed positions. Here, the ECU 80 stops the motor M and then has the motor M generate rotation in the reverse rotation direction at a speed lower than the first rotation speed N1. Then, the ECU 80 stops the motor M after the control plate 30 returns to the central position from the shifted position.

This allows ambient light and fresh air to simultaneously enter the vehicle interior.

Closing Operation of Roof Glass 3 and Sunshade 4

When a closing operation is performed with the third operation switch SW3 to simultaneously close the roof glass 3 and the sunshade 4, the ECU 80 receives a closing operation signal from the third operation switch SW3. Thus, the ECU 80 determines that the operation for simultaneously closing the roof glass 3 and the sunshade 4 has been requested and controls the motor M so that the first and second pinions G1 and G2 rotate in the reverse direction.

First, the ECU 80 controls the motor M so that the motor M rotates at the first rotation speed N1 or higher in the reverse direction before the lower end surface of the tubular output shaft 43 of the second pinion drive mechanism B is separated from the thick region Zb of the control portion 31b when the control plate 30 is pivoted from the central position. Thus, the pivoting of the control plate 30 stops just by slightly moving the control plate 30 from the central position. Accordingly, the pivoting of the control plate 30 is stopped when the control plate 30 is just slightly moved from the central position.

As a result, the tubular output shafts 43 of the first and second pinion drive mechanisms A and B are located at the upper elevation, and the second engagement pieces 46 of the tubular output shafts 43 are engaged with the third engagement pieces 9a of the first and second pinions G1 and G2.

In this state, the ECU 80 controls the motor M so that the rotation speed of the motor M in the reverse direction increases from the first rotation speed N1 to the second rotation speed N2 or higher.

When the rotation speed reaches the second rotation speed N2, the driving operation plate 60 of each of the first and second pinion drive mechanisms A and B is located at the coupled position, and the engagement pins 64 are engaged with the fourth engagement pieces 75. Thus, the tubular output shafts 43 of the first and second pinion drive mechanisms A and B rotate in the reverse direction.

Here, the tubular output shafts 43 of the first and second pinion drive mechanisms A and B are located at the upper elevation. Thus, the first and second pinions G1 and G2 are rotated in the reverse direction by the rotational force from the tubular output shafts 43. Further, the roof glass 3 and the sunshade 4 are moved in the closing direction by the reverse rotation of the first and second pinions G1 and G2.

When, for example, the roof glass 3 and the sunshade 4 move to the fully closed positions, a stopping operation is performed with the third operation switch SW3. Then, the ECU 80 stops the motor M so that the roof glass 3 and the sunshade 4 stop at the fully closed positions. Here, the ECU 80 stops the motor M, and then rotates the motor M in the forward rotation direction at a speed lower than the first rotation speed N1. Then, the ECU 80 stops the motor M after the control plate 30 returns to the central position from the shifted position.

This simultaneously blocks ambient light and fresh air to enter the vehicle interior.

The above embodiment has the advantages described below.

(1) In the above embodiment, the rotational force of the motor M can be transmitted to at least one of the first and second pinions G1 and G2 just by controlling the rotation speed of the same motor M. Thus, the opening/closing operation of at least one of or both of the roof glass 3 and the sunshade 4 can be performed with the same motor M.

Thus, an inexpensive, compact, and light vehicle sunroof device can be obtained.

(2) In the above embodiment, the pivot position of the control plate 30, which is fixed to the switching output shaft 13, is controlled so that the tubular output shaft 43 of each of the first and second pinion drive mechanisms A and B is located at the upper elevation or the lower elevation. The tubular output shaft 43 of each of the first and second pinion drive mechanisms A and B is controlled to be at the upper elevation or the lower elevation so that the rotational force of the motor M can be transmitted to at least one of or both of the first and second pinions G1 and G2.

Thus, the driving of the first and second pinions G1 and G2 can be switched with a simple configuration.

(3) In the above embodiment, the first pinion drive mechanism A and the second pinion drive mechanism B have the same structure. Thus, the same components can be used and the mechanisms can be easily assembled.

The above embodiment may be modified as described below.

The first spring SP1 and the third spring SP3 in the above embodiment may be provided with an auxiliary member that restricts the displacement in a direction orthogonal to the expanding and compressing direction.

Figure 13:
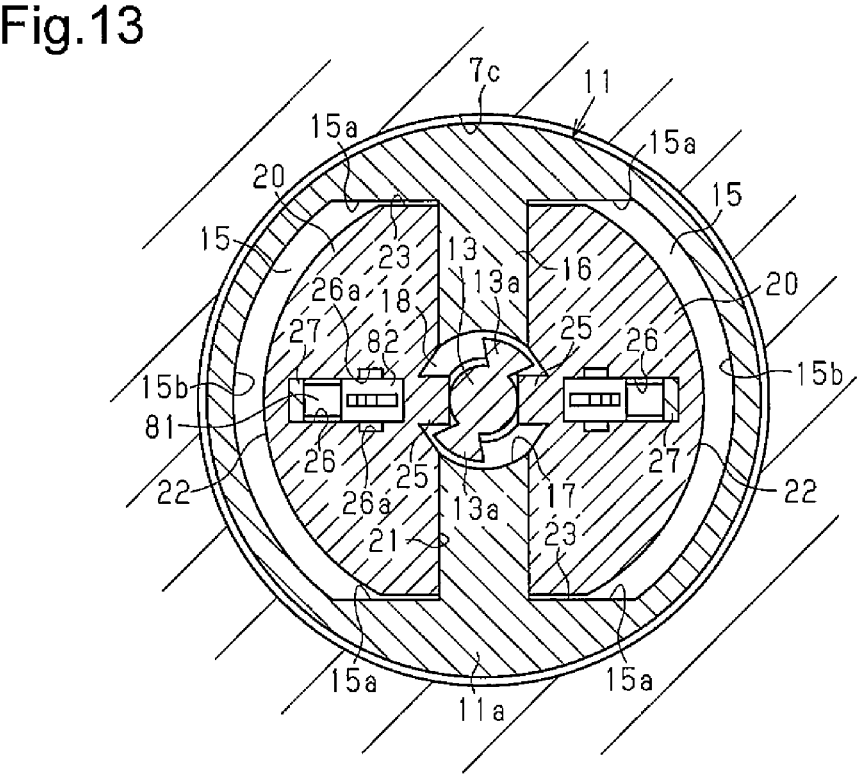
FIG. 13 is a diagram showing first and second covers that are coupled in a modified example.
Figure 14:
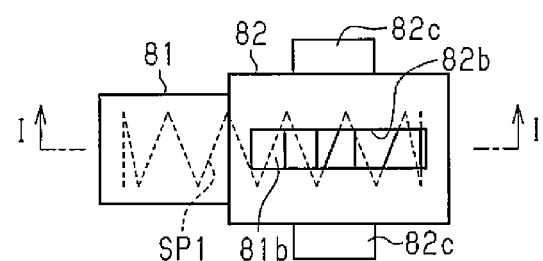
FIG. 14 is a plan view showing the first and second covers of FIG. 13.
Figure 15:
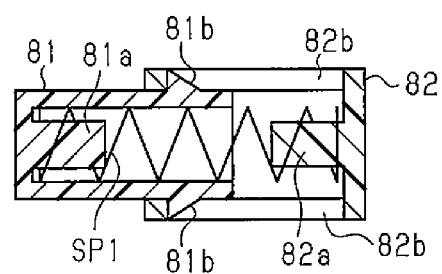
FIG. 15 is a cross-sectional view taken along line I-I in FIG. 14.

For example, as shown in FIGS. 13 to 15, the first spring SP may be provided with first and second covers 81 and 82, which serve as the auxiliary members. More specifically, the first cover 81 has the form of a tetragonal tube including a closed end. A cylindrical support post 81*a* (refer to FIG. 15) is formed on the closed end. Hooks 81*b*, which project outward, are formed on the outer surfaces of two opposing side walls of the first cover 81 at the open side. The second cover 82 has the form of a tetragonal tube including a closed end. A cylindrical support post 82*a* (refer to FIG. 15) is formed on the closed end. The tubular portion of the second cover 82 is formed to be large enough to allow the tubular portion of the first cover 81 to be fitted into the second cover 82. Elongated holes 82*b* are formed in opposing side walls of the second cover 82 at positions corresponding to the hooks 81*b*. The first cover 81 is fitted in the second cover 82 with the hooks 81*b* accommodated in the elongated holes 82*b*. This allows the first cover 81 to be movable relative to the second cover 82 so as to be extendable from or retractable into the second for an amount corresponding to the movable amount of the hooks 81*b* in the elongated holes 82*b*. Further, separation of the first cover 81 from the second cover 82 is restricted. The first spring SP1 is accommodated in the first cover 81 and the second cover 82 under a compressed condition with both ends respectively fitted onto the support posts 81*a* and 82*a*.

Projections 82*c* are formed in this example on the two side walls of the second cover 82 that do not include the elongated holes 82*b*. Recesses 26*a*, in which the projections 82*c* are fitted, are formed in the spring accommodation holes 26 of the switching operation plate 20.

The first and second covers 81 and 82, accommodating the first spring SP1, are accommodated in the spring accommodation holes 26, with the projections 82*c* fitted in the recesses 26*a* and the bottom portion of the first cover 81 in contact with the latching piece 27.

Thus, the first and second covers 81 and 82 restrict the displacement in the direction orthogonal to the extending and compressing direction of the first spring SP1. This prevents, for example, buckling of the first spring SP1, which serves as a compression coil spring. Further, the coupling efficiency may be improved. More specifically, for example, in the above embodiment, in which the first spring SP1 is directly accommodated in the spring accommodation hole 26, it is difficult to design and manage the distance between the bottom portion of the fitting recess 7*c* (refer to FIG. 3) of the case housing 7 and the flange 11*a* of the switching wheel main body 11. A long distance that may lead to the buckling of the first spring SP1. However, the modified example prevents such buckling. Furthermore, in the above embodiment, for example, the first spring SP1 may buckle and pop out of the spring accommodation hole 26 after being accommodated in the spring accommodation hole 26 and before the switching wheel main body 11 (switching worm wheel 10) is coupled to the case housing 7. This lowers the coupling efficiency. The modified example shown in FIGS. 13 to 15 improves the coupling efficiency. Further, the first and second covers 81 and 82 of this example are held by the elongated holes 82*b* and the hooks 81*b* so as not to be separated. This facilitates handling and improves the coupling efficiency.

Figure 16:
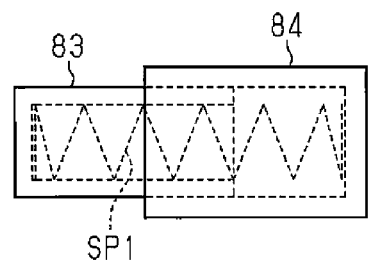
FIG. 16 is a plan view showing first and second covers in a modified example.

The first and second covers 81 and 82 in the modified example (refer to FIGS. 13 to 15) may have the form of a simple tetragonal tube having a closed end as shown in FIG. 16. In this example (refer to FIG. 16), separation of the coupled covers cannot be restricted. Nevertheless, displacement in the direction orthogonal to the extending and compressing direction of the first spring SP1 can be restricted with a simple configuration.

Figure 17:
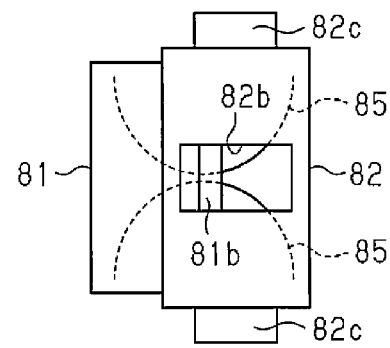
FIG. 17 is a plan view showing a plate spring and first and second covers in a modified example.
Figure 18:
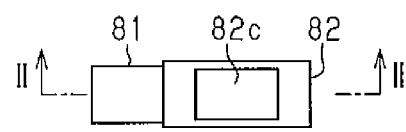
FIG. 18 is a side view showing the first and second covers of FIG. 17.
Figure 19:
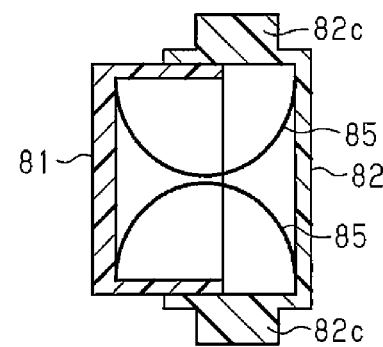
FIG. 19 is a cross-sectional view taken along line II-II in FIG. 18.
Figure 20:
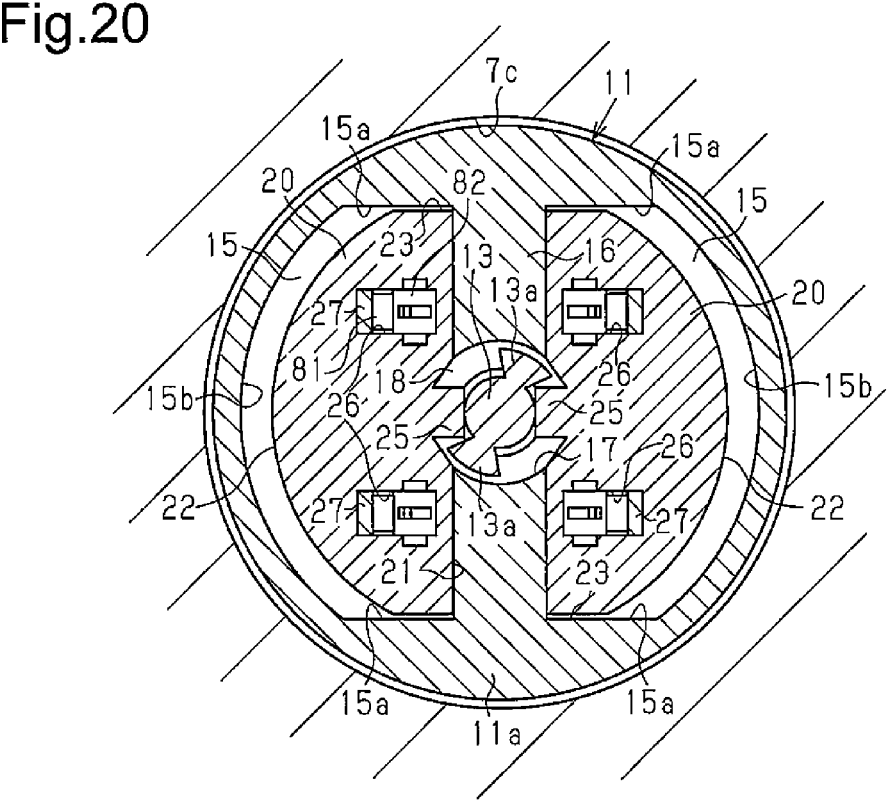
FIG. 20 is a diagram showing first and second covers that are coupled in a modified example.
Figure 21:
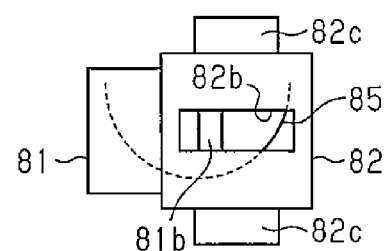
FIG. 21 is a plan view showing a plate spring and the first and second covers of FIG. 20.
Figure 22:
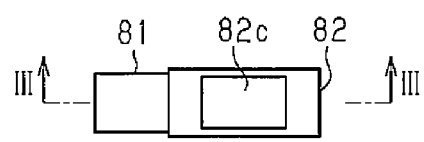
FIG. 22 is a side view showing the first and second covers of FIG. 21.
Figure 23:
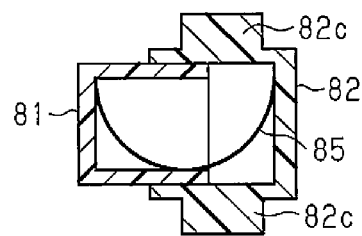
FIG. 23 is a cross-sectional view taken along line III-III in FIG. 22.

The first spring SP1 in the modified example (refer to FIGS. 13 to 15) does not have to be a compression coil spring and may be plate springs 85 (third elastic member) as shown in FIGS. 17 to 19. In this example, the single first spring SP1 is changed to the two plate springs 85. The first and second covers 81 and 82 are changed in size from that of the modified example (refer to FIGS. 13 to 15) so as to be able to accommodate the two plate springs 85. Components having similar functions in this example and the modified example (refer to FIGS. 13 to 15) are denoted with the same reference numerals. Such components will not be described.

Further, as shown in FIGS. 20 to 23, the first and second covers 81 and 82 may be changed in size to accommodate a single plate spring 85 (refer to FIGS. 17 to 19) may be used. In this case, two coupled members may be provided for each switching operation plate 20. More specifically, in this example, two spring accommodation holes 26 are formed in each switching operation plate 20. The two spring accommodation holes 26 are located at symmetric positions and are parallel to a straight line lying along the engagement pins 25 and the center axis O1. The latching piece 27 is formed at a position corresponding to each spring accommodation hole 26. The first and second covers 81 and 82, which accommodate a single plate spring 85, are accommodated in the spring accommodation hole 26 like in the modified example described above. This obtains the same advantages as the modified example.

Figure 24:
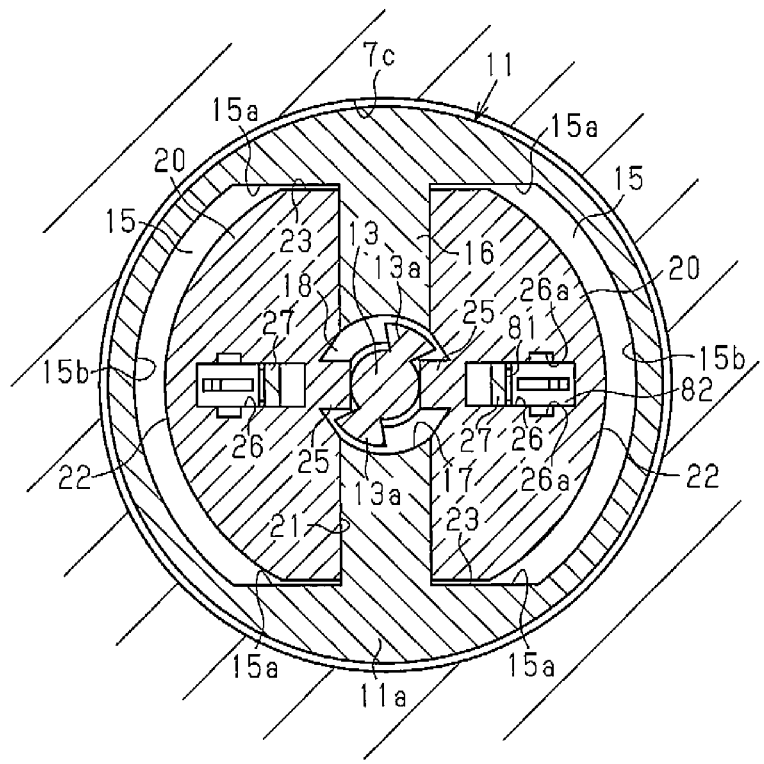
FIG. 24 is a diagram showing first and second covers that are coupled in a modified example.
Figure 25:
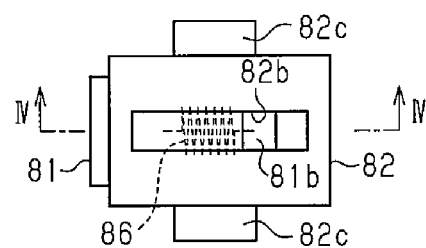
FIG. 25 is a plan view showing a tensile coil spring and the first and second covers of FIG. 24.
Figure 26:
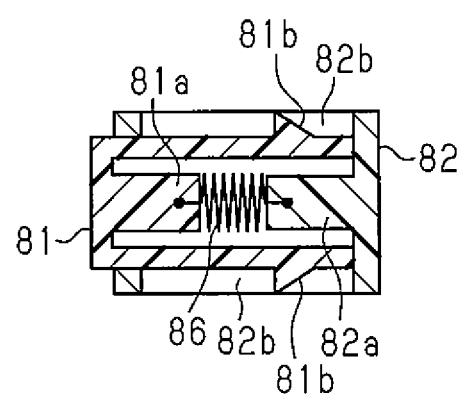
FIG. 26 is a cross-sectional view taken along line IV-IV in FIG. 25.
Figure 27:
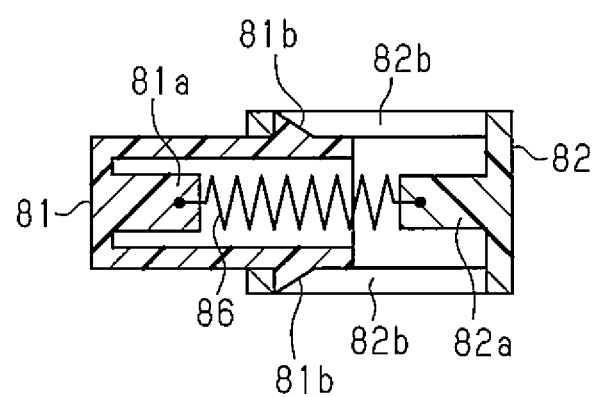
FIG. 27 is a cross-sectional view showing the tensile coil spring of FIG. 26 when expanded.

The first spring SP1 in the modified example (refer to FIGS. 13 to 15) does not have to be the compression coil spring and may be a tensile coil spring 86 (third elastic member) as shown in FIGS. 24 to 27. More specifically, in this example, the tensile coil spring 86 is accommodated in the first cover 81 and the second cover 82 with both ends of the tensile coil spring 86 respectively fixed to the support posts 81*a* and 82*a* as shown in FIG. 26. As shown in FIG. 24, the recess 26*a* of the spring accommodation hole 26 is formed at the outer side of the spring accommodation hole 26 in the radial direction (side farther from the center axis O1), and the latching piece 27 is arranged toward the inner side from the recess 26*a* of the spring accommodation hole 26 in the radial direction. The first and second covers 81 and 82 accommodating the tensile coil spring 86 are accommodated in the spring accommodation hole 26 so that the projection 82*c* is fitted in the recess 26*a* and the bottom portion of the first cover 81 is fixed to the latching piece 27. In this example, the tensile coil spring 86 pulls the switching operation plate 20 toward the inner side in the radial direction (toward the center axis O1). The tensile coil spring 86 is set to extend when receiving centrifugal force like in the embodiment described above to move the switching operation plate 20 (engagement pin 25) to the disengaged position. In this configuration, buckling does not occur due to the use of the tensile coil spring 86. However, the coupling efficiency may be improved.

Although the modified examples described above (refer to FIGS. 13 to 27) are further examples of the first spring SP1, the third spring SP3 may be changed in the same manner.

The first pinion G1 does not necessarily have to be a sunshade driving pinion, and the second pinion G2 does not necessarily have to be roof glass driving pinion. The corresponding relationship may be reversed depending on the specification.

The opening and closing device is applied to a vehicle sunroof device in the above embodiment but may be applied to other devices for opening and closing an openable body.

The invention claimed is:

1. A clutched motor comprising:
   a first tubular output shaft that moves in an axial direction to rotate a first rotated member;
   a first rotating body rotated by a motor, wherein the first rotating body is coupled to the first tubular output shaft by a first clutch to be rotatable integrally with the first tubular output shaft;
   a second tubular output shaft that moves in the axial direction to rotate a second rotated member;
   a second rotating body rotated by the motor, wherein the second rotating body is coupled to the second tubular output shaft by a second clutch to be rotatable integrally with the second tubular output shaft;
   a control plate that pivots together with a pivot shaft to control movement of the first and second tubular output shafts in the axial direction; and
   a third rotating body rotated by the motor, wherein the third rotating body is coupled to the pivot shaft by a third clutch to be rotatable integrally with the pivot shaft, wherein:
   each of the first, second, and third clutches is a centrifugal clutch;
   the first and second clutches are configured to allow the first and second tubular output shafts to pivot when the motor generates rotation at a second rotation speed or higher and to stop pivoting of the first and second tubular output shafts when the motor generates rotation at a speed lower than the second rotation speed;
   the third clutch is configured to allow the pivot shaft to pivot when the motor generates rotation at a speed lower than a first rotation speed, which is lower than the second rotation speed, and to stop pivoting of the pivot shaft when the motor generates rotation at the first rotation speed or higher;
   the control plate is controlled to be arranged at a first pivot position, a second pivot position, or a third pivot position;
   at the first pivot position, the first and second tubular output shafts are moved to positions in the axial direction allowing the first and second rotated members to rotate;
   at the second pivot position, the first and second tubular output shafts are moved to positions in the axial direction allowing only the first rotated member to rotate; and
   at the third pivot position, the first and second tubular output shafts are moved to positions in the axial direction allowing only the second rotated member to rotate.

2. The clutched motor according to claim 1, wherein the first and second clutches respectively include:
   first and second driving operation members that pivot about center axes of the first and second rotating bodies when the first and second rotating bodies rotate, wherein the first and second driving operation members are movable in a radial direction relative to the corresponding center axis;
   first and second elastic members that allow the first and second driving operation members to move from a non-coupled position to a coupled position when centrifugal force based on the pivoting reaches a second centrifugal force due to the second rotation speed; and
   first and second driven bodies rotated integrally with the first and second tubular output shafts, wherein the first and second driven bodies support the first and second tubular output shafts to be movable in the axial direction,
   wherein when the first and second driving operation members reach the coupled position, first and second engaging members of the first and second driving operation members are engaged with first and second engaged members of the first and second driven bodies in a circumferential direction to pivot the first and second tubular output shafts.

3. The clutched motor according to claim 1, wherein the third clutch includes:
   a switching operation member that pivots about a center axis of the third rotating body when the third rotating body rotates, wherein the switching operation member is movable in a radial direction relative to the center axis; and
   a third elastic member that allows the switching operation member to move from an engaged position to a disengaged position when centrifugal force based on the rotation reaches a first centrifugal force due to the first rotation speed,
   wherein when the switching operation member reaches the engaged position, an engaging member of the switching operation member engages an engaged member of the pivot shaft in a circumferential direction to pivot the pivot shaft.

4. The clutched motor according to claim 2, wherein the third clutch includes:
   a switching operation member that rotates about a center axis of the third rotating body when the third rotating body rotates, wherein the switching operation member is movable in a radial direction relative to the center axis; and
   a third elastic member that allows the switching operation member to move from an engaged position to a disengaged position when centrifugal force based on the rotation reaches a first centrifugal force due to the first rotation speed, wherein
   when the switching operation member reaches the engaged position, an engaging member of the switching operation member engages an engaged member of the pivot shaft in a circumferential direction to pivot the pivot shaft, and
   at least one of the first, second, and third elastic members is provided with an auxiliary member that restricts displacement in a direction orthogonal to an extending and compressing direction of the at least one of the first, second, and third elastic members.

5. A device for opening and closing an openable body that opens and closes a first openable body and a second openable body, the device comprising:
   a first tubular output shaft that moves in an axial direction to rotate a first rotated member in order to open and close the first openable body;
   a first rotating body rotated by a motor, wherein the first rotating body is coupled to the first tubular output shaft by a first clutch to be rotatable integrally with the first tubular shaft;
   a second tubular output shaft that moves in the axial direction to rotate a second rotated member in order to open and close the second openable body;
   a second rotating body rotated by the motor, wherein the second rotating body is coupled to the second tubular output shaft by a second clutch to be rotatable integrally with the second tubular shaft;
   a control plate that pivots together with a pivot shaft to control movement of the first and second tubular output shafts in the axial direction; and a third rotating body rotated by the motor, wherein the third rotating body is coupled to the pivot shaft by a third clutch to be rotatable integrally with the pivot shaft, wherein:

each of the first, second, and third clutches is a centrifugal clutch;

the first and second clutches are configured to allow the first and second tubular output shafts to pivot when the motor generates rotation at a second rotation speed or higher and to stop pivoting of the first and second tubular output shafts when the motor rotates at a speed lower than the second rotation speed;

the third clutch is configured to allow the pivot shaft to pivot when the motor generates rotation at a speed lower than a first rotation speed, which is lower than the second rotation speed, and to stop pivoting of the pivot shaft when the motor generates rotation at the first rotation speed or higher;

the control plate is controlled to be arranged at a first pivot position, a second pivot position, or a third pivot position;

at the first pivot position, the first and second tubular output shafts are moved to positions in the axial direction allowing the first and second rotated members to rotate in order to open and close the first and second openable bodies;

at the second pivot position, the first and second tubular output shafts are moved to positions in the axial direction allowing only the first rotated member to rotate in order to open and close the first openable body; and at the second pivot position, the first and second tubular output shafts are moved to positions in the axial direction allowing only the second rotated member to rotate in order to open and close the second openable body.

6. The device for opening and closing an openable body according to claim 5, further comprising:

a first operation switch that opens and closes the first openable body;

a second operation switch that opens and closes the second openable body;

a third operation switch that simultaneously opens and closes the first and second openable bodies; and a control circuit that controls the motor to arrange the control plate at the second pivot position when the first operation switch is operated, arrange the control plate at the third pivot position when the second operation switch is operated, and arrange the control plate at the first pivot position when the third operation switch is operated.

7. The device for opening and closing an openable body according to claim 5, wherein the first openable body is a sunshade that opens and closes a roof opening formed in a roof panel of a vehicle, and the second openable body is a roof glass that opens and closes the roof opening.

* * * * *